(12) United States Patent
Wang et al.

(10) Patent No.: US 12,440,011 B2
(45) Date of Patent: Oct. 14, 2025

(54) COVER INCLUDING PEN RECEIVING PART, AND ELECTRONIC DEVICE INCLUDING SAME

(71) Applicant: Samsung Electronics Co., Ltd., Gyeonggi-do (KR)

(72) Inventors: Heesuk Wang, Gyeonggi-do (KR); Sunghan Park, Gyeonggi-do (KR); Wonseuk Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 843 days.

(21) Appl. No.: 17/585,973

(22) Filed: Jan. 27, 2022

(65) Prior Publication Data

US 2022/0142315 A1 May 12, 2022

Related U.S. Application Data

(63) Continuation of application No. PCT/KR2020/009865, filed on Jul. 27, 2020.

(30) Foreign Application Priority Data

Jul. 29, 2019 (KR) .................. 10-2019-0091751

(51) Int. Cl.
*A45C 11/00* (2006.01)
*A45C 13/02* (2006.01)
(Continued)

(52) U.S. Cl.
CPC .............. *A45C 11/00* (2013.01); *A45C 13/02* (2013.01); *A45C 13/1069* (2013.01);
(Continued)

(58) Field of Classification Search
CPC ..... G06F 2200/1632; G06F 2200/1633; A45C 11/00; A45C 2011/003; A45C 2011/002; H04B 1/3888
See application file for complete search history.

(56) References Cited

U.S. PATENT DOCUMENTS 6,295,198 B1  9/2001  Loh et al.
9,748,999 B2  8/2017  Nyholm et al.
(Continued)

FOREIGN PATENT DOCUMENTS

JP    11-88520 A       3/1999
JP    2006-085515 A    3/2006
(Continued)

OTHER PUBLICATIONS

Translation KR 10-2107889 (Year: 2020).*
(Continued)

*Primary Examiner* — Corey N Skurdal
(74) *Attorney, Agent, or Firm* — Cha & Reiter, LLC

(57) ABSTRACT

A cover and electronic device are disclosed herein. The cover is attachable to the electronic device, and includes: a first region covering a first portion of a first surface of the electronic device, when the cover is attached to the electronic device, a second region covering a second portion of the first surface of the electronic device, the second region adjacent to the first region, and a receiving part protruding from a surface of the first region of the cover and including a hollow for receiving an electronic pen, wherein the first region of the cover is pivotable relative to the second region of the cover, such that the first region of the cover is spaced away from the first surface of the electronic device while the second region of the cover contacts the first surface of the electronic device.

18 Claims, 25 Drawing Sheets

(51) Int. Cl.
*A45C 13/10* (2006.01)
*G06F 3/0354* (2013.01)

(52) U.S. Cl.
CPC .......... *A45C 11/002* (2025.01); *A45C 11/003* (2025.01); *A45C 2013/025* (2013.01); *A45C 2200/15* (2013.01); *G06F 3/03545* (2013.01)

(56) References Cited

U.S. PATENT DOCUMENTS

| | | | | |
|---|---|---|---|---|
| 10,206,471 | B2* | 2/2019 | Hemesath | A45C 11/00 |
| 10,310,557 | B1* | 6/2019 | Wu | G06F 3/0416 |
| 11,184,989 | B2* | 11/2021 | Kang | H05K 5/0226 |
| 2012/0013781 | A1* | 1/2012 | Yamagiwa | G06F 1/1626 |
| | | | | 345/173 |
| 2014/0073377 | A1* | 3/2014 | Chang | H04B 1/3888 |
| | | | | 455/575.8 |
| 2020/0166973 | A1 | 5/2020 | Kang et al. | |

FOREIGN PATENT DOCUMENTS

| | | |
|---|---|---|
| JP | 2016-126412 A | 7/2016 |
| JP | 2018-030289 A | 3/2018 |
| KR | 20-0461377 Y1 | 7/2012 |
| KR | 10-2014-0007049 A | 1/2014 |
| KR | 20-2015-0001868 | 5/2015 |
| KR | 10-2016-0001563 A | 1/2016 |
| KR | 10-2016-0101477 A | 8/2016 |
| KR | 10-2016-0129505 A | 11/2016 |
| KR | 10-1750677 | 6/2017 |
| KR | 10-2018-0127861 A | 11/2018 |
| KR | 10-2019-0078422 A | 7/2019 |

OTHER PUBLICATIONS

Korean Office Action dated Aug. 27, 2024.
Korean Office Action dated Dec. 7, 2023.
Notice of Patent Grant dated Jan. 8, 2025.

* cited by examiner

COVER INCLUDING PEN RECEIVING PART, AND ELECTRONIC DEVICE INCLUDING SAME

CROSS-REFERENCE TO RELATED APPLICATION(S)

This application is a continuation of and based on and claims priority under 35 U.S.C. § 120 to PCT International Application No. PCT/KR2020/009865, which was filed on Jul. 27, 2020, and claims priority to Korean Patent Application No. 10-2019-0091751, filed on Jul. 29, 2019 in the Korean Intellectual Property Office, the disclosures of which are incorporated by reference herein their entirety.

TECHNICAL FIELD

Certain embodiments of the present disclosure relate to an electronic device including a stylus, and more particular, to an electronic device having a cover formed in the housing that includes a pen receiving portion.

BACKGROUND

Many modern electronic devices today are equipped with touch screens which can perform input and output functionality. These screens are often large displays which increase user convenience. As the usage of such devices has grown, there has been corresponding growth in accompanying peripheral devices.

As touch screens have grown in size, and occupy more and more surface area of such electronic devices, electronic styli have been used in conjunction with the touch screens. For example, a user may input information to a touch screen, using contact of an electronic stylus.

The input functions of the electronic device may be implemented such that an electronic stylus can generate diverse inputs to the electronic device, such as operation of picture and text-related functions. Thus, electronic styli have become increasingly popular with large-screen devices, such as tablets and smartphones.

SUMMARY

The electronic stylus is often detachably housed within the electronic device, or detachably coupled to a side surface of the electronic device. However, the electronic stylus has grown in size to increase usability and grip-comfort for users. As the thickness of styli have increased, it may become difficult to house the electronic stylus in the device.

Sometimes, an alternative is implemented in which the electronic stylus is detachably affixed to a surface of the electronic device. In these cases, however, there is a risk that the stylus will be accidentally lost. Therefore, it is desirable to protect the stylus using some sort of housing or cover.

The present disclosure provides a cover for housing an electronic stylus, the cover including a pen receiving portion. This may prevent the pen from being lost, even when the electronic pen is detachably affixed to a front surface or rear surface of the electronic device.

A cover attached to an electronic device of certain embodiments of the present disclosure may include An electronic device of certain embodiments may include An electronic device of certain embodiments may include A cover of certain embodiments may provide a space in which an electronic pen may be accommodated between one surface of an electronic device and the cover and, as a result, may prevent the electronic pen from being damaged or lost.

DETAILED DESCRIPTION

Figure 1A:
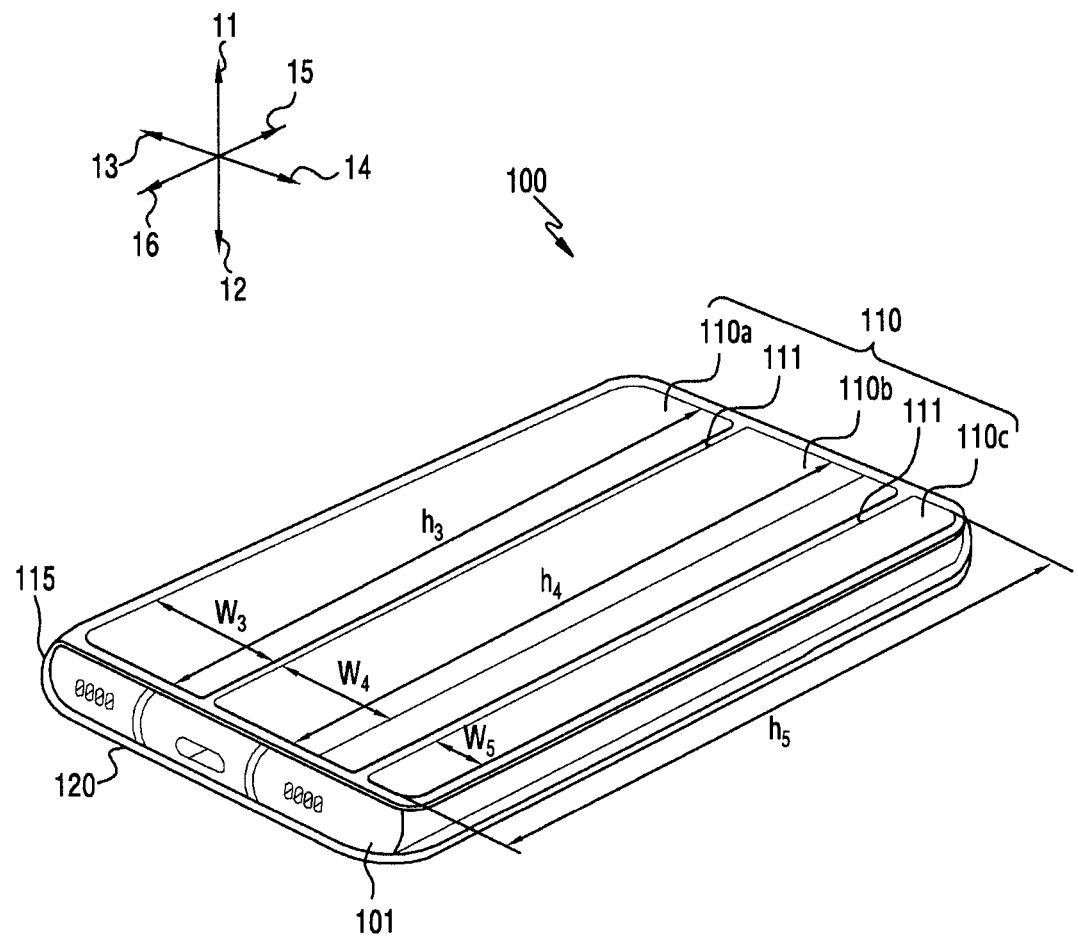
FIG. 1A is a perspective view illustrating a cover attached to an electronic device according to certain embodiments.

An electronic device of certain embodiments disclosed in the present document may be a device of various types. The electronic device may include, for example, a portable communication device (e.g., a smart phone), a computer device, a portable multimedia device, a portable medical device, a camera, a wearable device, or a home appliance device. The electronic device of an embodiment of the present document is not limited to the above-described devices.

Certain embodiments of the present document and the terms used therein are not intended to limit technological features described in the present document to specific embodiments, and should be understood as including various modifications, equivalents, or alternatives of a corresponding embodiment. In relation to a description of the drawings, like reference numerals may be used for similar or related component elements. A singular form of a noun corresponding to an item may include one or more of the item, unless the relevant context clearly dictates otherwise. In the present document, each of words such as "A or B", "at least one of A and B", "at least one of A or B", "A, B or C", "at least one of A, B and C", and "at least one of A, B or C" may include any one of items enumerated together in a corresponding word among the words, or all possible combinations thereof. Terms such as "first", "second", or "firstly" or "secondly" may simply be used to distinguish a corresponding component element from other component elements, and may not limit corresponding component elements in other aspects (e.g., importance or order). When it is referenced that one (e.g., first) component element is "coupled" or "connected" to another (e.g., second) component element with or without the term "functionally" or "communicatively", it means that one component element may be connected to the another component element directly (e.g., wiredly), wirelessly, or through a third component element.

According to certain embodiments, each component element (e.g., a module or a program) of the above-described component elements may include a singular or a plurality of entities. According to certain embodiments, among the above-described corresponding component elements, one or more component elements or operations may be omitted, or one or more other component elements or operations may be added. Alternatively or additionally, a plurality of component elements (e.g., modules or programs) may be integrated into one component element. In this case, the integrated component element may perform one or more functions of each component element of the plurality of component elements identically or similarly to those performed by a corresponding component element among the plurality of component elements prior to the integration. According to certain embodiments, operations performed by a module, a program, or another component element may be executed sequentially, in parallel, repeatedly or heuristically, or one or more operations may be executed in a different order or be omitted, or one or more other operations may be added.

Figure 1B:
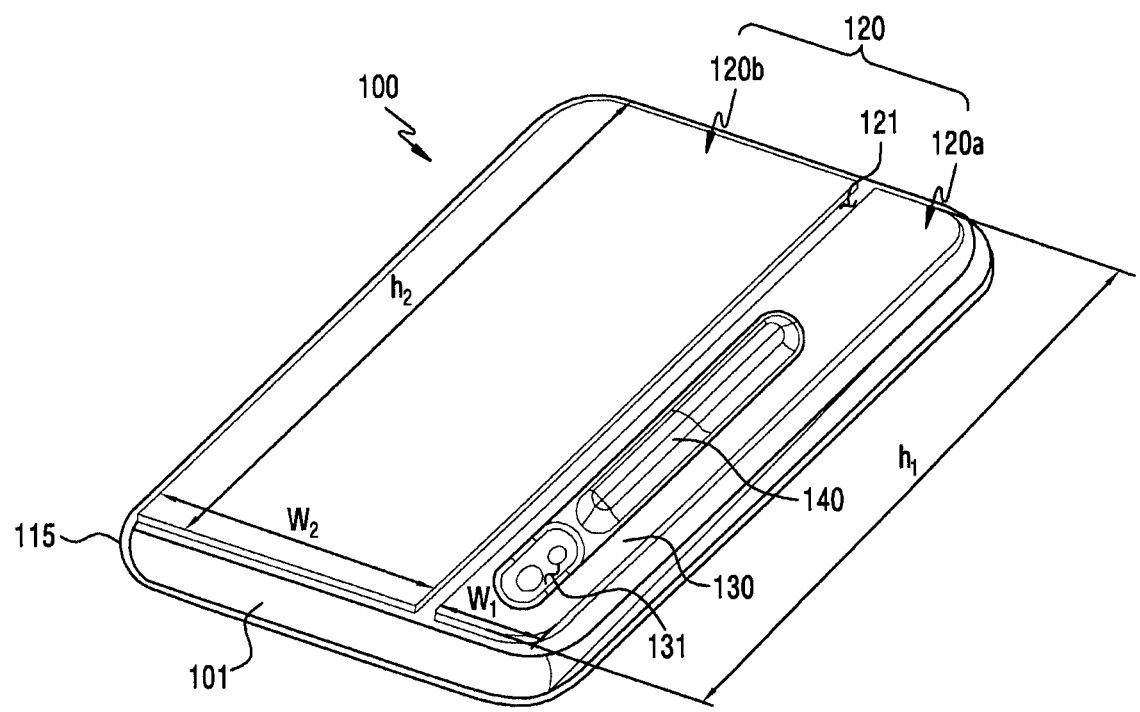
FIG. 1B is a perspective view of the cover of FIG. 1A viewed from the rear.
Figure 1C:
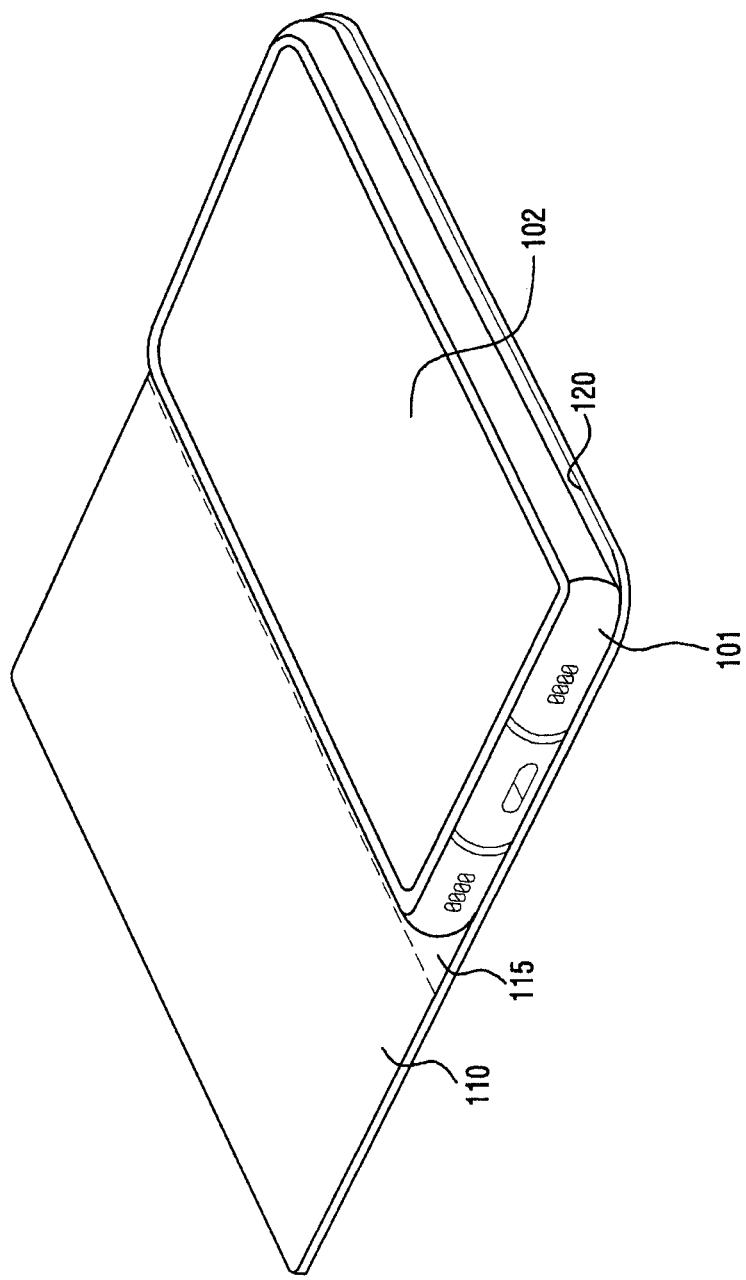
FIG. 1C is a perspective view illustrating a state in which the cover of FIG. 1A is unfolded.

FIG. 1A is a perspective view illustrating a cover 100 attached to an electronic device 101 of certain embodiments. FIG. 1B is a perspective view of the cover 100 of FIG. 1A viewed from the rear. FIG. 1C is a perspective view illustrating a state in which the cover 100 of FIG. 1A is unfolded.

Figure 1D:
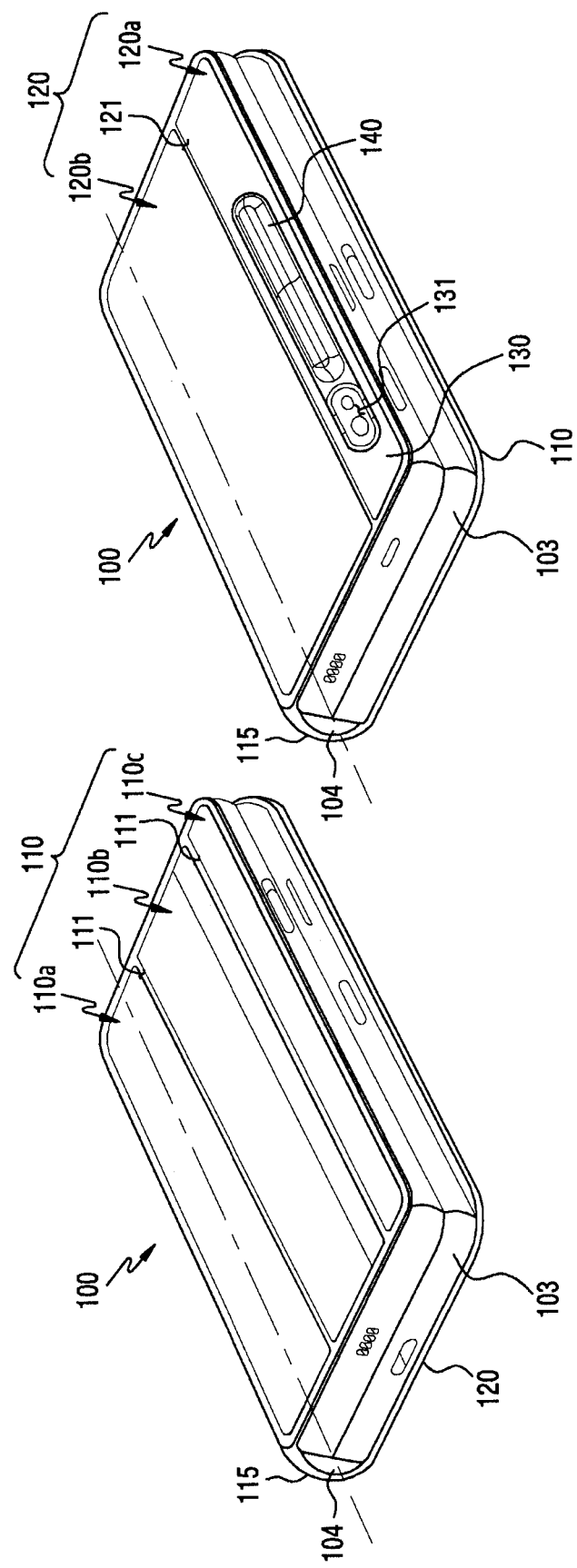
FIG. 1D is a perspective view illustrating a state in which a cover is attached to a foldable electronic device of a folded state according to an embodiment.
Figure 1E:
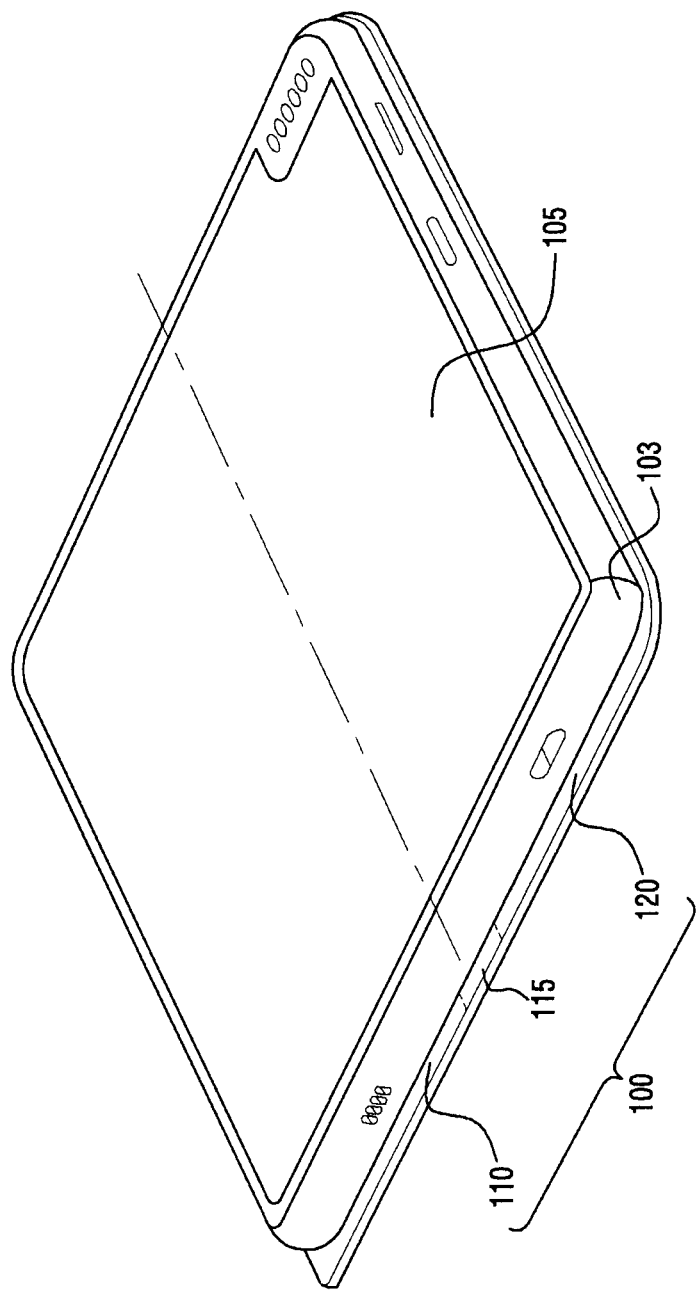
FIG. 1E is a perspective view illustrating a state in which a cover is attached to a foldable electronic device of an unfolded state.

FIG. 1D is a perspective view illustrating a state in which the cover 100 is attached to a foldable electronic device 103 of a folded state according to an embodiment. FIG. 1E is a perspective view illustrating a state in which the cover 100 is attached to the foldable electronic device 103 of an unfolded state.

Referring to FIG. 1A, FIG. 1B, and FIG. 1C, the cover 100 of certain embodiments may include a first cover 110 (or "front cover"), a second cover 120 (or "rear cover"), and a side cover 115. The cover 100 may be attached to at least one region of the electronic device 101, and protect a front surface 101a, a rear surface, and/or one side surface of the electronic device 101.

According to an embodiment, the first cover 110 may cover at least partial region of one surface (e.g., the front surface 101a of the electronic device 101 oriented in a first direction 11) of the electronic device 101, and protect component elements (e.g., a touch screen 102) exposed through the one surface of the electronic device 101. The second cover 120 may cover the other surface (e.g., the rear surface of the electronic device 101 oriented in a second direction 12) generally facing the one surface, and protect component elements of the other surface of the electronic device 101.

The first cover 110 and the second cover 120 may be connected through the side cover 115, which may be formed to cover a side surface of the electronic device 101 oriented in a third direction 13 (or a fourth direction 14) of the electronic device 101. As an example, as the first cover 110 and the second cover 120 may be connected through the side cover 115, and the first cover 110 may be rotated independently of the second cover 120 attached to the rear surface of the electronic device 101.

Referring to FIG. 1A, the cover 100 of an embodiment may be disposed in a folded state in which the first cover 110 covers one surface of the electronic device 101 (e.g., the front surface 101a of the electronic device 101) and the second cover 120 covers the other surface of the electronic device 101, thereby protecting both the one surface and the other surface of the electronic device 101, respectively.

Referring to FIG. 1C, the cover 100 may be disposed in an unfolded state in which the first cover 110 is rotated with respect to the second cover 120, and the first cover 110 and the second cover 120 are thus set on an equivalent plane, thereby exposing one surface of the electronic device 101 to the external environment. As an example, since the first cover 110 and the second cover 120 are disposed on the same plane, the touch screen 102 of the electronic device 101 may be exposed to the external environment. A user may thus manipulate the cover 100 depending on whether the electronic device 101 is or is not in use, switching between the folded state and the unfolded state of the cover 100.

According to an embodiment, as seen in FIG. 1B, the second cover 120 may be segmented into a first region 120a having a first width (w1) and a first height (h1) and a second region 120b having a second width (w2) and a second height (h2). The segmented first region 120a and second region 120b may be connected through a connecting member 121, and the first region 120a may be rotated independently relative to the second region 120b via the connecting member 121. As an example, the first region 120a may be rotated and spaced apart from the back surface of the electronic device 101 when the second region 120b is coupled to the back surface of the electronic device 101. Here, the width may indicate a horizontal length, and the height may indicate a vertical length, and the width and height have the same meaning even in the following. Although it is illustrated in the drawings that the first width (w1) and the second width (w2) are different from each other, the first width (w1) and the second width (w2) may also be the same as each other as well according to another embodiment. Also, although it is illustrated in the drawings that the first height (h1) and the second height (h2) are the same as each other, but in other embodiments, the first height (h1) and the second height (h2) may be different from each other as well. As an example, a height (i.e., the first height (h1)) of the first region 120a may be shorter than a height (i.e., the second height (h2)) of the second region 120b, and inversely, the height (i.e., the second height (h2)) of the second region 120b may be shorter than the height (i.e., the first height (h1)) of the first region 120a as well. According to an embodiment, the first region 120a may include a reinforcing member 130 (or "stiffener") and a receiving part 140. The reinforcing member 130 may be formed in a plate shape and cover at least one region of the rear surface of the electronic device 101. A hole 131 passing through the reinforcing member 130 may be formed in one region of the reinforcing member 130, and when the first region 120a is attached to the rear surface of the electronic device 101, a partial region of the rear surface of the electronic device 101 may be visible through the hole 131. The receiving part 140 may protrude, as relative to the reinforcing member 130, and define a space in which a pen (not shown) may be accommodated between the first region 120a and the back surface of the electronic device 101. A detailed description of the reinforcing member 130 and the receiving part 140 will be made later.

According to an embodiment, as seen in FIG. 1D, the first cover 110 may be segmented into a third region 110a having a third width (w3) and a third height (h3), a four region 110b having a fourth width (w4) and a fourth height (h4), and a fifth region 110c having a fifth width (w5) and a fifth height (h5). The third region 110a, the fourth region 110b, and the fifth region 110c may be connected via a connecting member 111, respectively, and the third region 110a, the fourth region 110b, and the fifth region 110c may be rotated independently via the connecting member 111. As one example, the first cover 110 may mount to the electronic device 101 through the segmented third region 110a, fourth region 110b and fifth region 110c, but a detailed description thereof will be made later. According to an embodiment, the third width (w3), the fourth width (w4), and the fifth width (w5) may be the same as or be different from each other. Also, it is illustrated in the drawings that the third height (h3), the fourth height (h4), and the fifth height (h5) are the same as each other, in another embodiment, at least one of the third height (h3), the fourth height (h4), and the height (h5) may be different. As one example, the fifth height (h5) may be lower than the third height (h3) and/or the fourth height (h4). Referring to FIG. 1D and FIG. 1E, the cover 100 of an embodiment may be attached to a foldable electronic device 103, and protect at least one surface of the foldable electronic device 103 as well. In the present disclosure, the foldable electronic device 103 includes an electronic device that may include a foldable or flexible display and be folded at a predetermined ratio of a screen.

Referring to FIG. 1D, another embodiment is indicated involving a foldable electronic device 103, having a single flexible display spanning two housings that are rotatable relative to one another. When the foldable electronic device 103 is disposed in a folded state, the cover 100 may be attached to both at least a partial region of one surface and another surface of the foldable electronic device 103, thereby protecting both surfaces of the foldable electronic device 103.

According to an embodiment, the first cover 110 may be attached to at least a partial region of one surface of the foldable electronic device 103, and when disposed thereon, may provide protect the one surface of the foldable electronic device 103. The second cover 120 may be attached to at least a partial region of the other surface of the foldable electronic device 103 generally facing the one surface, and protect the other surface of the foldable electronic device 103. The first region 120a of the second cover 120 may be rotated as to be removed from the other surface of the foldable electronic device 103 according to user manipulation, and the receiving part 140 provided in the first region 120a may include a space in which a pen may be housed, in the other surface of the foldable electronic device 103. The side cover 115 may be located in one side surface of the foldable electronic device 103, and protect the one side surface. As an example (e.g., FIG. 1D), the side cover 115 may be located in a folding region 104 of the foldable electronic device 103, and protect the folding region 104, but according to an embodiment, the side cover 115 may be located on one side surface opposite to the folding region 104 as well.

Referring to FIG. 1E, when the foldable electronic device 103 is disposed in an unfolded state (or a flat state), the cover 100 of an embodiment may be attached to any one surface among the front surface or rear surface, of the foldable electronic device 103, and protect one of the front surface or rear surface of the foldable electronic device 103 as well.

According to an embodiment, as the foldable electronic device 103 is unfolded, the first cover 110, the second cover 120, and the side cover 115 may be disposed thereto on the same plane, and the first cover 110, the second cover 120, and the side cover 115 may be attached to the rear surface of the foldable electronic device 103 to protect the rear surface. According to another embodiment (not shown), the first cover 110, the second cover 120, and the side cover 115 may be attached to the front surface of the foldable electronic device 103, and protect the display 105 as well.

That is, when the cover 100 of an embodiment is attached to the foldable electronic device 103, the cover 100 may be attached to the one surface and the other surface of the foldable electronic device 103 at the same time, corresponding to the state (e.g., the folded state or the unfolded state) of the foldable electronic device 103 (e.g., the cover of FIG. 1D), or may be attached to the one surface among the one surface and the other surface of the foldable electronic device 103 (e.g., the cover of FIG. 1E).

Figure 2:
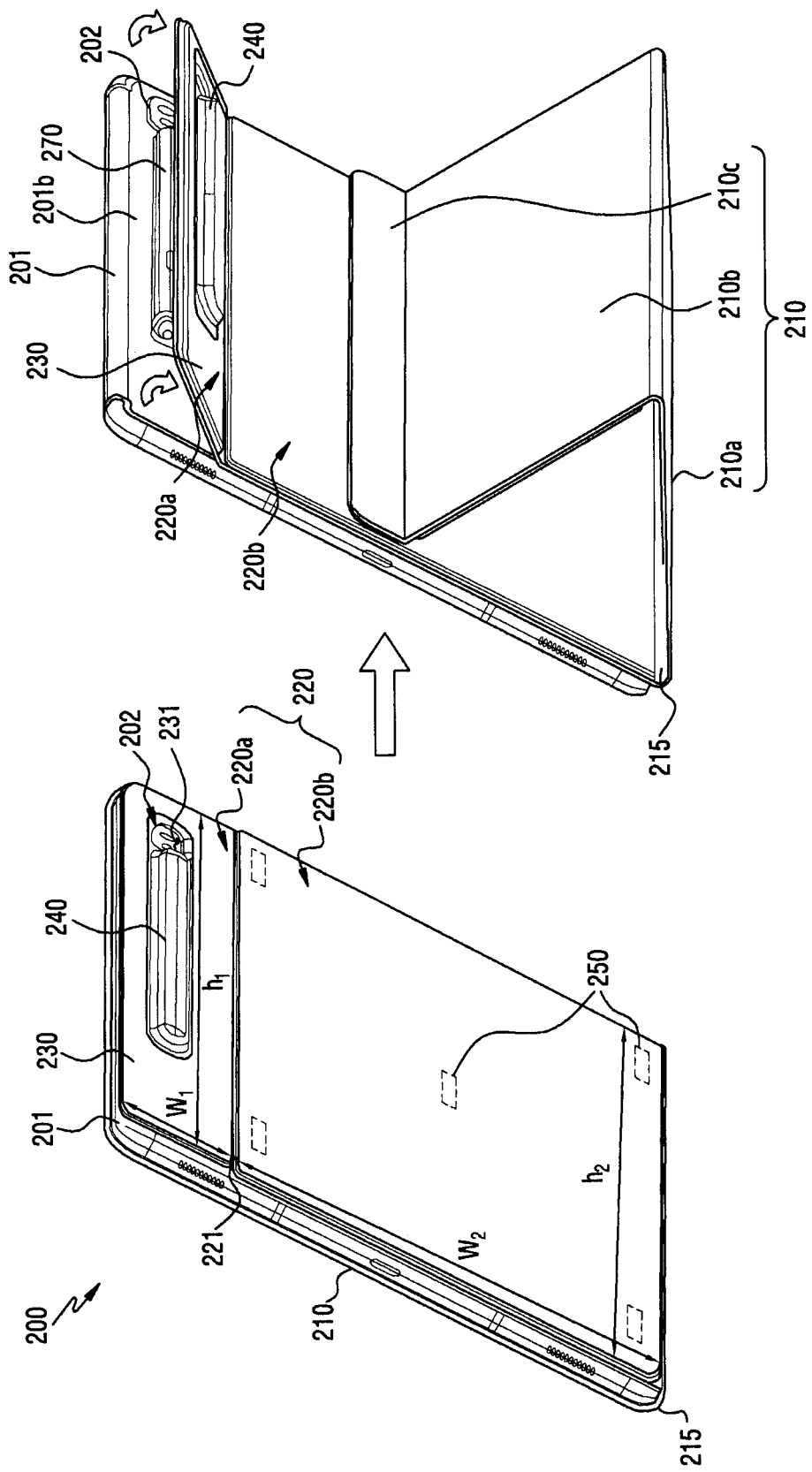
FIG. 2 is a diagram illustrating a process in which a partial region of a cover is spaced apart from one surface of an electronic device according to an embodiment.

FIG. 2 is a diagram illustrating a process in which a partial region 220a of a cover 200 is spaced apart from one surface 201b of an electronic device 201 according to an embodiment.

Referring to FIG. 2, the cover 200 (e.g., the cover 100 of FIG. 1) of an embodiment may be attached to the electronic device 201, and include a front cover 210 (e.g., the first cover 110 of FIG. 1A), a rear cover 220 (e.g., the second cover 120 of FIG. 1B), and a side cover 215 (e.g., the side cover 115 of FIG. 1B). At least one of component elements of the cover 200 may be the same as or similar to at least one of the component elements of the cover 100 of FIG. 1, and a duplicate description will be omitted.

According to an embodiment, the rear cover 220 may be attached to a rear surface 201b (or a back surface) of the electronic device 201, and include a first region 220a (e.g., the first region 120a of FIG. 1B) having a first width (w1) and a first height (h1), and a second region 220b (e.g., the second region 120b of FIG. 1B) having a second width (w2) and a second height (h2). As an example, the first region 220a and second region 220b of the rear cover 220 may be segmented and connected through a connecting member 221. As the first region 220a and the second region 220b are connected through the connecting member 221, the first region 220a may rotate independently with a criterion of the second region 220b. Although it is illustrated in the drawings that the first height (h1) and the second height (h2) are the same as each other, the first height (h1) and the second height (h2) may be different from each other according to an embodiment.

As an example, in a state in which the second region 220*b* is attached to a partial region of the rear surface 201*b* of the electronic device 201, the first region 220*a* may be attached to the rear surface 201*b* of the electronic device 201 except the region to which the second region 220*b* is attached. As another example, in a state in which the second region 220*b* is attached to the partial region of the rear surface 201*b* of the electronic device 201, the first region 220*a* may be spaced apart from the rear surface 201*b* of the electronic device 201. As a result, the partial region of the rear surface 201*b* of the electronic device 201 may be visible through the rear cover 220.

According to an embodiment, a plurality of magnets 250 may be disposed within the first region 220*a*, and the second region 220*b*, of the rear cover 220, and the first region 220*a* and the second region 220*b* may be fixed to the rear surface 201*b* of the electronic device 201. The first region 220*a* of the rear cover 220 may include a reinforcing member 230 (e.g., the reinforcing member 130 of FIG. 1B) and a receiving part 240 (e.g., the receiving part 140 of FIG. 1B).

According to an embodiment, the reinforcing member 230 may be formed in a plate shape and be attached to the rear surface 201*b* of the electronic device 201. The reinforcing member 230 may be formed of a plastic material having excellent rigidity and flatness and a good corrosion resistance. According to an embodiment, the reinforcing member 230 may be formed of an epoxy material, but may be formed of another material (e.g., polycarbonate) as well according to an embodiment. To improve the aesthetic characteristic of an appearance of the cover 200 and prevent damage to the reinforcing member 230, the reinforcing member 230 may be compressed by an outer skin and an inner skin. The outer skin and the inner skin may be formed of, as an example, polyurethane (PU), leather, a synthetic material, and/or a fabric material, but is not limited thereto.

A hole 231 (e.g., the hole 131 of FIG. 1B) passing through the reinforcing member 230 may be formed in one region of the reinforcing member 230. Through the hole 231 formed in the reinforcing member 230, a partial region of the rear surface 201*b* of the electronic device 201 may be visible through the rear cover 220, not only when the first region 220*a* is spaced apart from the rear surface 201*b* of the electronic device 201, but also when the first region 220*a* is attached to the rear surface 201*b* of the electronic device 201. As an example, when the first region 220*a* is attached to the rear surface 201*b* of the electronic device 201, a camera 202 may be disposed in a region of the rear surface 201*b* of the electronic device 201 corresponding to the hole 231. Accordingly, even when the first region 220*a* is attached to the rear surface 201*b* of the electronic device 201 through the hole 231, the camera 202 disposed on the rear surface 201*b* of the electronic device 201 may be visible and operative through the rear cover 220.

According to an embodiment, the receiving part 240 may protrude, as formed from one region of the reinforcing member 230. When the first region 220*a* is attached to the rear surface 201*b* of the electronic device 201, the receiving part 240 may include a space where a pen 270 may be accommodated between the receiving part 240 and the rear surface 201*b* of the electronic device 201. In detail, a groove (not shown) is formed in the receiving part 240 and thus, the space where the pen 270 may be accommodated may be formed between the receiving part 240 and the rear surface 201*b* of the electronic device 201. According to an embodiment, the receiving part 240 protruded and formed with respect to the reinforcing member 230, which may be formed through injection molding and, to secure the ease and rigidity of molding, the receiving part 240 and the reinforcing member 230 may be formed of differing materials. As an example, the reinforcing member 230 may be formed of an epoxy material, and the receiving part 240 may be formed of a thermoplastic polyurethane (TPU) material.

In particular, the receiving part 240 may be formed of a thermoplastic polyurethane material having a shore hardness of about 80 degrees to 98 degrees. When the receiving part 240 is formed of a material having a shore hardness of less than 80 degrees, a problem may occur in that when the pen 270 is disposed in an internal space of the receiving part 240, it is not adequately protected from external impact, because a strength of the receiving part 240 is insufficient. Conversely, when the receiving part 240 is formed of a material having a shore hardness of greater than 98, a problem occurs in that cracks may form as a result of external impact. Accordingly, to this, the receiving part 240 may be formed of a thermoplastic polyurethane material having a shore hardness of 80 degrees or more and 98 degrees or less, but is not limited thereto, and may be formed of other materials capable of securing moldability and the rigidity of the receiving part 240 as well.

According to an embodiment, the plurality of magnets 250 may be included within the second region 220*b*. The plurality of magnets 250 may allow the second region 220*b* to be attached to a partial region of the rear surface 201*b* of the electronic device, and as an example, the plurality of magnets 250 may be disposed in each corner of the second region 220*b* and the center of the second region 220*b*. A plurality of magnets (not shown) may be included even in the first region 220*a* identically with the second region 220*b*, but a detailed description of the magnets disposed in the first region 220*a* will be made later.

According to an embodiment, the front cover 210 may include a third region 210*a* (e.g., the third region 110*a* of FIG. 1A), a fourth region 210*b* (e.g., the fourth region 110*b* of FIG. 1A), and a fifth region 210*c* (e.g., the fifth region 110*c* of FIG. 1A). The third region 210*a*, the fourth region 210*b*, and the fifth region 210*c* may be segmented and divided, and each of the third region 210*a*, the fourth region 210*b*, and the fifth region 210*c* may be connected through a connecting member (e.g., the connecting member 111 of FIG. 1A). Through the above structure, the third region 210*a*, the fourth region 210*b*, and the fifth region 210*c* may rotate independently. Referring to FIG. 2, a user may rotate the third region 210*a*, the fourth region 210*b*, and the fifth region 210*c*, respectively, in which the front cover 210 may function as a stand for supporting and upright positioning of the device. In detail, the third region 210*a* may be rotated to be in contact with the ground by user manipulation, and the fourth region 210*b* connected to the third region 210*a* may be rotated such that one end contacts with the ground and the other end contacts with the second region 220*b* of the rear cover 220. The fifth region 210*c* connected to the fourth region 210*b* may be attached to one region of the rear cover 220, and as a result, the third region 210*a*, the fourth region 210*b* and the fifth region 210*c* of the front cover 210 may be arranged in a triangular structure when viewed from the side. That is, according to an embodiment, the front cover 210 may serve as a holder for supporting the rear surface 201*b* of the electronic device 201 through the above-described structure (e.g., the triangular structure).

Figure 3A:
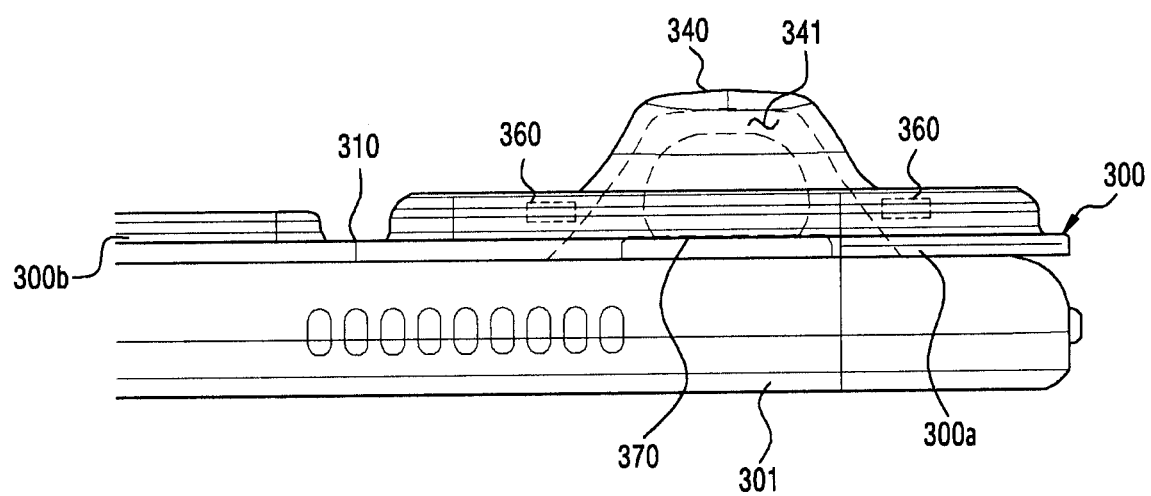
FIG. 3A is a diagram illustrating a state in which a pen is accommodated within a receiving part.
Figure 3B:
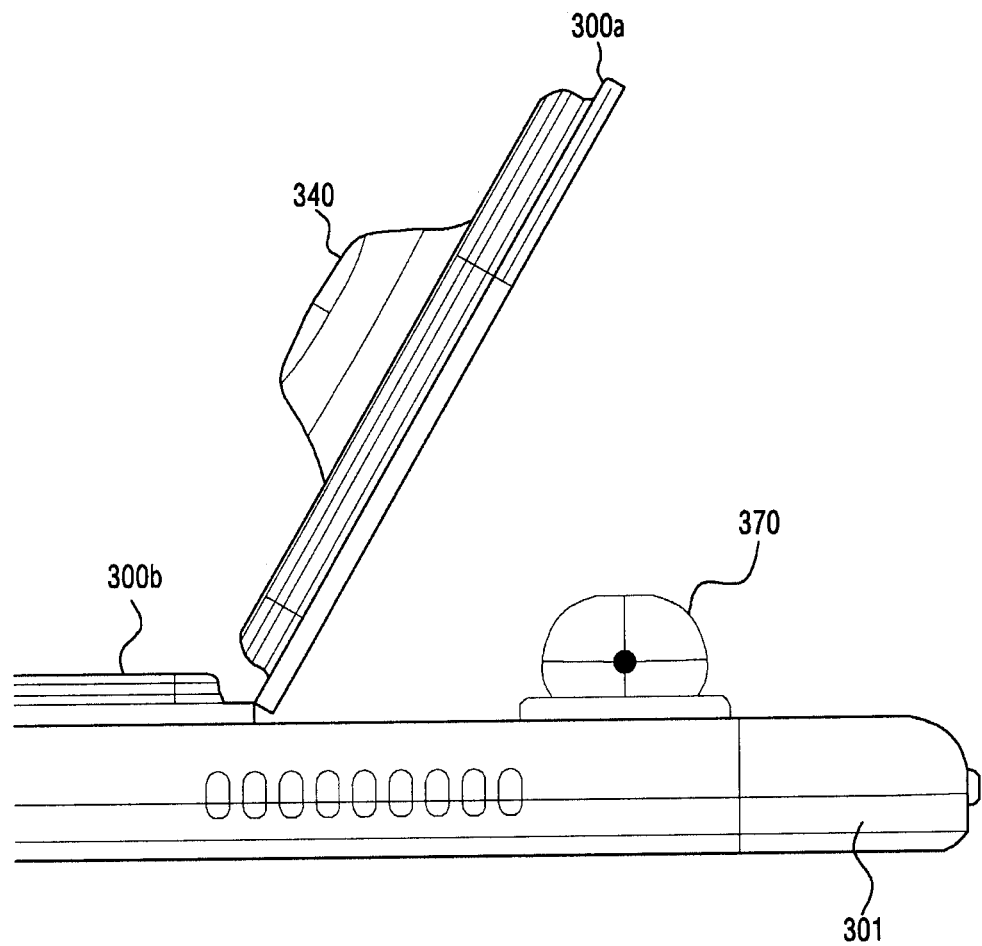
FIG. 3B is a diagram illustrating a state in which a partial region of a cover is spaced apart from one surface of an electronic device.

FIG. 3A is a diagram illustrating a state in which a pen 370 is accommodated in a receiving part 340. FIG. 3B is a diagram illustrating a state in which a partial region 300a of a cover is spaced apart from one surface of an electronic device 301.

Referring to FIG. 3A and FIG. 3B, a cover 300 of an embodiment may be attached to at least one surface of the electronic device 301, and may include a first region 300a (e.g., the first region 220a of FIG. 2), a second region 300b (e.g., the second region 220b of FIG. 2), and/or a connecting member 310 (e.g., the connecting member 221 of FIG. 2) connecting the first region 300a and the second region 300b. As the first region 300a and the second region 300b are connected through the connecting member 310, the first region 300a may rotate independently of the second region 300b. According to one example (e.g., FIG. 3A), both the first region 300a and the second region 300b may be attached to one surface of the electronic device 301, but according to another example (e.g., FIG. 3B), in a state in which the second region 300b is attached to one surface of the electronic device 301, the first region 300a may be spaced apart from one surface of the electronic device 301 by a rotation thereof. At least one magnet 360 may be disposed within the first region 300a and, when the first region 300a contacts to one surface of the electronic device 301, the at least one magnet 360 may detachably affix the first region 300a to the one surface of the electronic device 301.

According to an embodiment, the first region 300a may include the receiving part 340 (e.g., the receiving part 240 of FIG. 2). The receiving part 340 may be formed on first region 300a as to protrude from the same, and a groove 341 may be formed within the receiving part 340. When the first region 300a is attached to one surface of the electronic device 301, an internal space may be formed between the first region 300a and the one surface of the electronic device 301 by the groove 341, and the pen 370 may be housed in the internal space formed therein. As an example, the groove 341 may be formed in a shape corresponding to an outer circumferential surface of the pen 370, but is not limited thereto, and may be formed in other shapes (e.g., a square and/or a triangle) being able to form the internal space where the pen 370 may be accommodated as well. That is, when a user does not use the pen 370, the pen 370 may be more secure against loss through the groove 341 formed inside the receiving part 340, and the pen 370 may be protected from damaged caused by external impact. When the user uses the pen 370, the user may separate the first region 300a apart from the one surface of the electronic device 301 and open the receiving part 340, and take out and use the pen 370 accommodated in the receiving part 340.

Figure 4A:
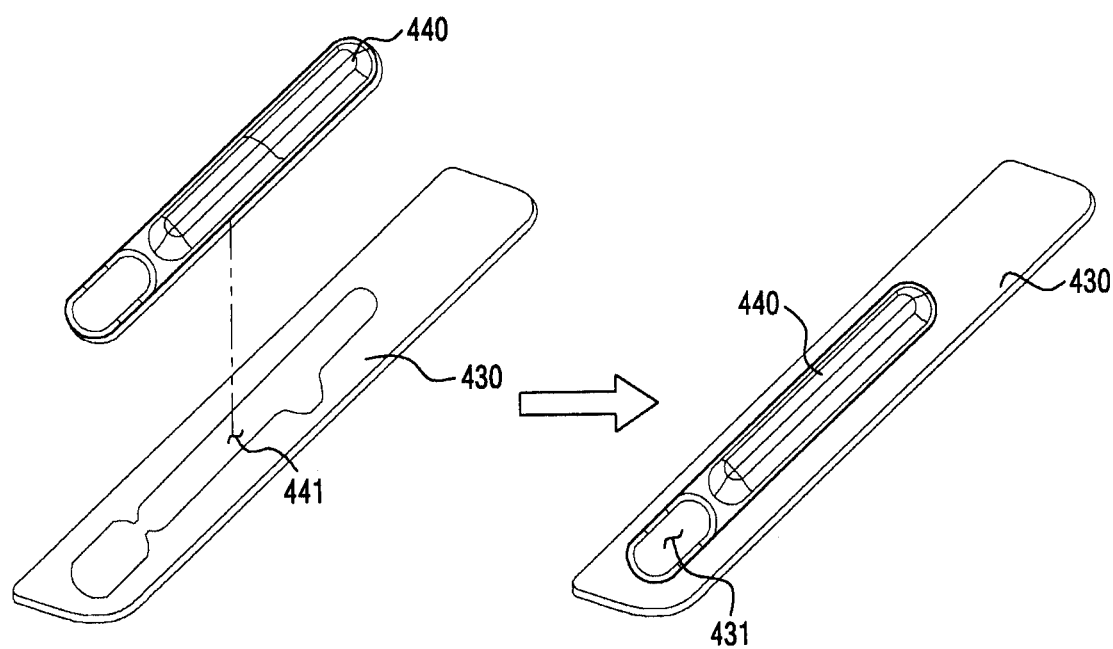
FIG. 4A is an exploded perspective view and a combined perspective view of a reinforcing member and a receiving part.
Figure 4B:
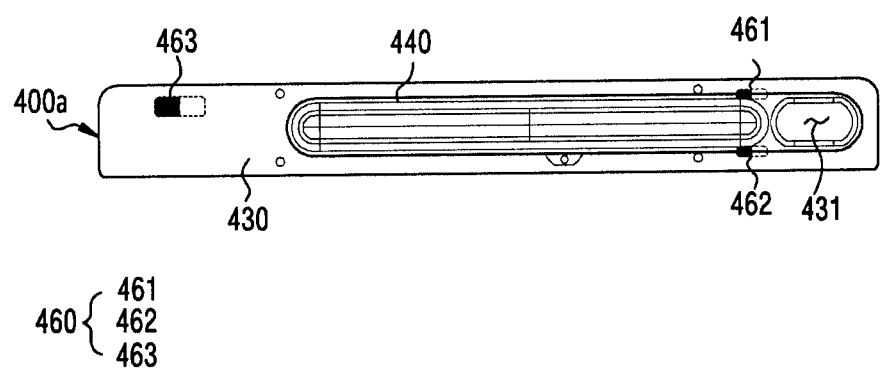
FIG. 4B is a front view of a first region of a cover according to an embodiment.
Figure 4C:
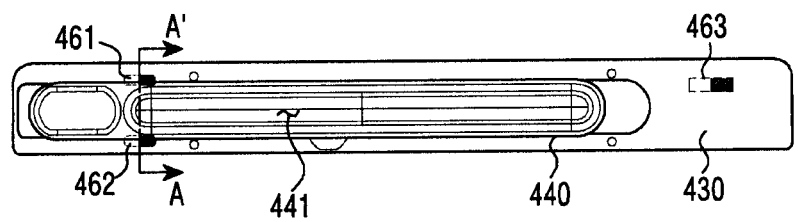
FIG. 4C is a front view of the first region of FIG. 4B viewed from the rear.
Figure 4D:
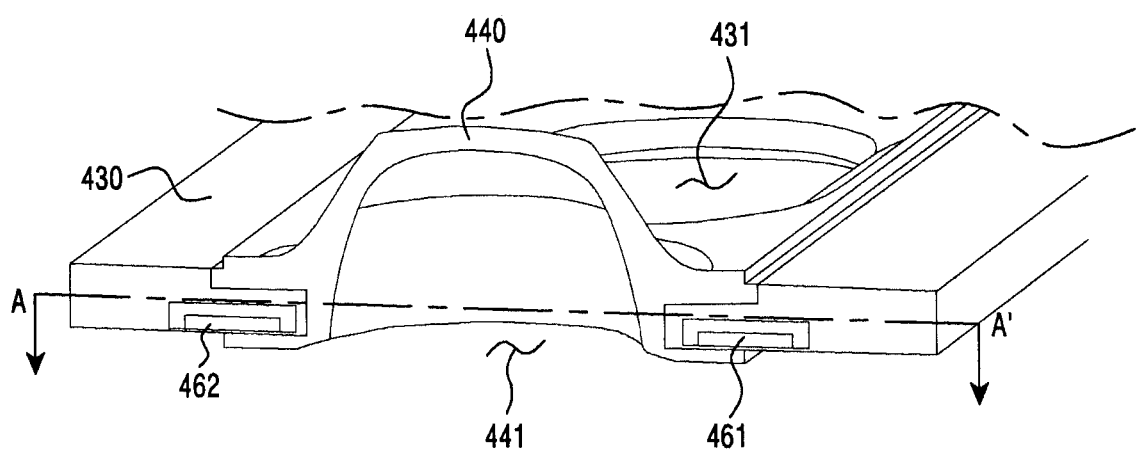
FIG. 4D is a cross-sectional perspective view of the first region taken in an A-A' direction.

FIG. 4A is an exploded perspective view and a combined perspective view of a reinforcing member 430 and a receiving part 440. FIG. 4B is a front view of a first 1 region 400a of a cover according to an embodiment. FIG. 4C is a front view of the first region 400a of FIG. 4B viewed from the rear. FIG. 4D is a cross-sectional perspective view of the first region 400a taken in an A-A' direction.

Referring to FIG. 4A, FIG. 4B, FIG. 4C, and FIG. 4D, the cover (e.g., the cover 300 of FIG. 3A) of an embodiment may include the first region 400a (e.g., the first region 300a of FIG. 3A), and the first region 400a may include the reinforcing member 430, a hole 431 passing through a partial region of the first region 400a, and the receiving part 440 (e.g., the receiving part 340 of FIG. 3A). At least one of component elements of the cover of an embodiment may be the same as or similar to at least one of the component elements of the cover of FIG. 2 (e.g., the cover 200 of FIG. 2) or the cover of FIGS. 3A and 3B (e.g., the cover 300 of FIGS. 3A and 3B), and a duplicate description will be omitted.

Referring to FIG. 4A, the receiving part 440 may be disposed in one region of the reinforcing member 430 of an embodiment. An inner hole 441 may be formed in at least one region of the reinforcing member 430, and the receiving part 440 of an embodiment may be provided in one region of the reinforcing member 430 in a scheme of being assembled to the inner hole 441. According to another embodiment, the receiving part 440 may be provided in the one region of the reinforcing member 430 via attachment to the inner hole 441 through an adhesive or bonding agent. According to an embodiment, the receiving part 440 may be provided in the one region of the reinforcing member 430 via fusion to the inner hole 441. Although not illustrated in the drawings, according to another embodiment, the receiving part 440 may be provided in the one region of the reinforcing member 430 in such a way that the receiving part 440 is injected into the inner hole 441 (e.g., single injection, double injection, insert molding, etc.), and a detailed description thereof will be made later.

According to an embodiment, the hole 431 passing through the partial region of the first region 400a may refer to a partial region of the inner hole 441 in which the receiving part 440 is omitted. According to another embodiment, the hole 431 may be a hole formed by processing a partial region of the receiving part 440, but is not limited thereto.

According to an embodiment, a plurality of magnets 460 (e.g., the magnets 360 of FIGS. 3A and 3B) may be mounted on the reinforcing member 430, and the plurality of magnets 460 may be combined, by a magnetic force, with magnets embedded in the electronic device, in which the first region 400a may be fixed to one surface of the electronic device. According to an embodiment, the plurality of magnets 460 may include a first magnet 461 and a second magnet 462 that are mounted in positions adjacent to the inner hole 441 formed in the reinforcing member 430, and/or a third magnet 463 that is mounted in one region of an edge of the reinforcing member 430. The third magnet 463 may be mounted in a position spaced apart from the first magnet 461 and the second magnet 462, in which the first region 400a may be more firmly fixed to the electronic device. According to an embodiment, the first magnet 461, the second magnet 462, and the third magnet 463 may be formed as a dipole magnet having a high coupling force compared to a unit area. Accordingly, the first magnet 461, the second magnet 462, and the third magnet 463 may reduce a space utilized for mounting, while firmly fixing the first region 400a to one surface of the electronic device.

Referring to FIG. 4D, the plurality of magnets 460 may be mounted in an inner space of the reinforcing member 430. When the magnet 460 is mounted in the inner space of the reinforcing member 430, all traces of the mounting of the magnet 460 within the reinforcing member 430 may be hidden in terms of visibility, from the exterior of the reinforcing member 430. That is, the magnets 461, 462, and 463 may be embedded inside the reinforcing member 430, to increase the aesthetic characteristics of the cover, and a detailed description thereof will be made later.

Figure 5A:
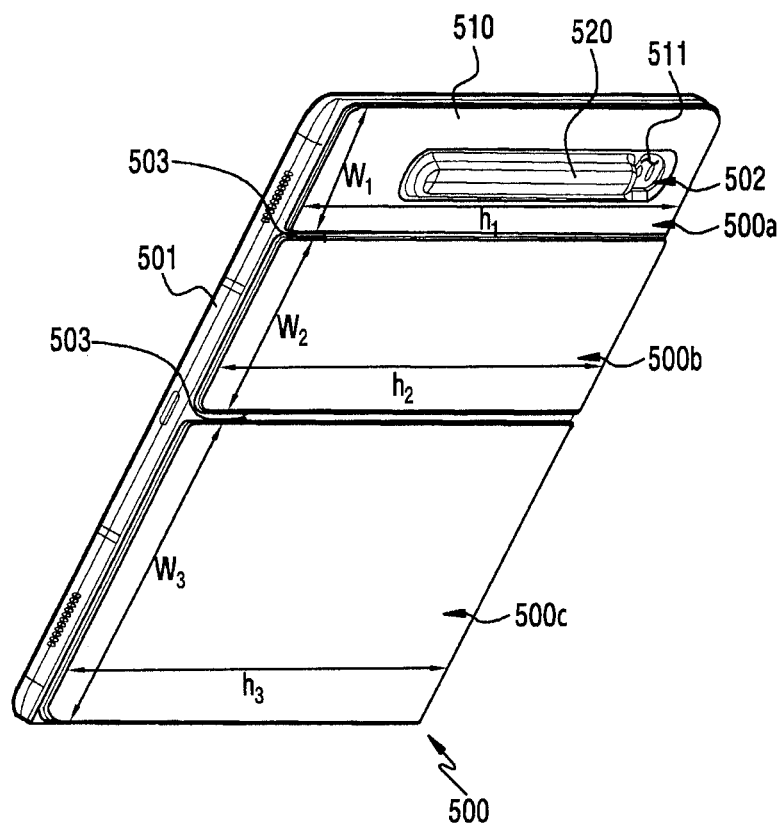
FIG. 5A is a perspective view illustrating a state in which a cover is attached to one surface of an electronic device according to an embodiment.
Figure 5B:
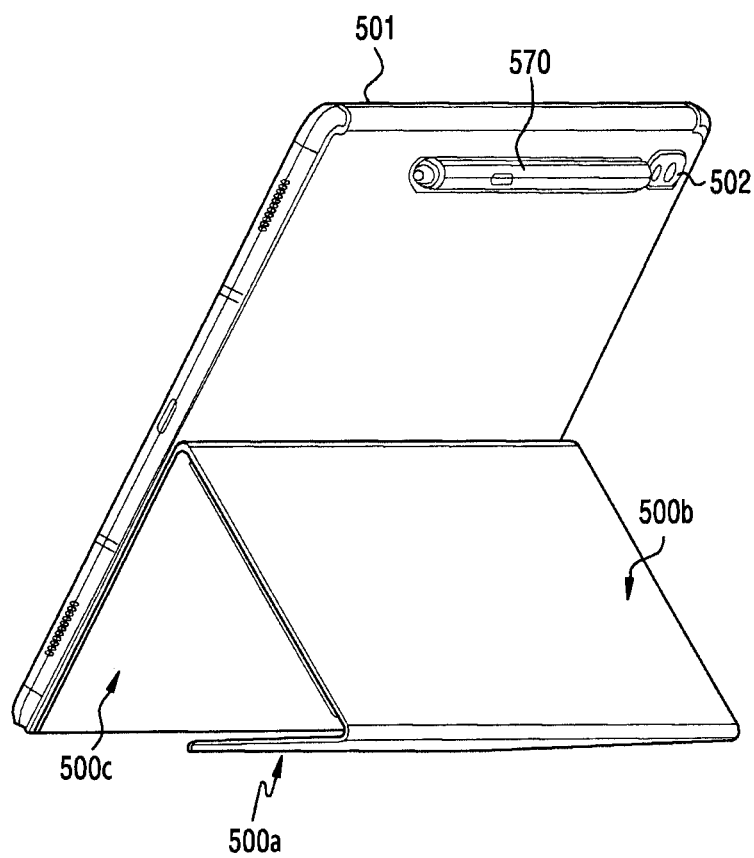
FIG. 5B is a perspective view illustrating a state in which a partial region of the cover of FIG. 5A is folded and an electronic device is held by the cover.

FIG. 5A is a perspective view illustrating a state in which a cover is attached to one surface of an electronic device according to an embodiment. FIG. 5B is a perspective view illustrating a state in which a partial region of the cover of FIG. 5A is folded and the electronic device is held by the cover.

Referring to FIG. 5A and FIG. 5B, the cover 500 of an embodiment may be formed to be attached to one of a front surface or rear surface of the electronic device 501, and cover at least a partial region of the one surface. FIG. 5A or FIG. 5B illustrates a state in which the cover 500 is attached to the rear surface of the electronic device 501, but the cover 500 may be attached to the front surface of the electronic device 501 according to an embodiment.

According to an embodiment, the cover 500 may be divided into a first region 500*a* having a first width (w1) and a first height (h1), a second region 500*b* having a second width (w2) and a second height (h2), and a third region 500*c* having a third width (w3) and a third height (h3). The first region 500*a*, the second region 500*b*, and the third region 500*c* may be segmented and divided, and each segmented region may be connected through a connecting member 503. In accordance with an embodiment, at least some of the first width (w1), the second width (w2), and the third width (w3) may be the same as each other, and any one of the first height (h1), the second height (h2), and the third height (h3) may be different. According to an embodiment, a plurality of magnets (not shown) may be mounted in the first region 500*a*, the second region 500*b*, and the third region 500*c*. The first region 500*a*, the second region 500*b*, and the third region 500*c* may be fixed to one surface of the electronic device 501 through a magnetic coupling between magnets mounted therein and a magnet embedded in an electronic device 501.

As the first region 500*a*, the second region 500*b*, and the third region 500*c* are interconnected through the connecting member 503, the first region 500*a*, the second region 500*b*, and the third region 500*c* may be independently rotatable. As an example, in a state in which the third region 500*c* is contacting to one surface of the electronic device 501, the first region 500*a* and the second region 500*b* may be rotated as to be spaced apart from the one surface of the electronic device 501, and in a state in which the second region 500*b* and the third region 500*c* are contacting to one surface of the electronic device 501, the first region 500*a* may be rotated as to be spaced apart from the one surface of the electronic device 501.

Referring to FIG. 5B, according to an embodiment, the first region 500*a*, the second region 500*b*, and the third region 500*c* may be each independently rotated while coupled to a surface of the electronic device 501. As an example, in a state where the third region 500*c* is attached to one surface of the electronic device 501, the second region 500*b* may be rotated so as to be in contact at one end with one surface of the electronic device 501 (as per user manipulation of the configuration of the cover), and in contact at the other end of the second region 500*b* with the ground, providing a support for an upright positioning of the electronic device. The first region 500*a* connected to the second region 500*b* may be rotated to be in contact with the ground, whereby the first region 500*a*, the second region 500*b*, and the third region 500*c* may be arranged in a triangular structure when viewed from the side. The first region 500*a*, the second region 500*b*, and the third region 500*c* may thus support standing of the electronic device 501 through the above-described triangular structure.

According to an embodiment, the first region 500*a* may include the reinforcing member 510 (e.g., the reinforcing member 230 of FIG. 2) and a receiving part 520 (e.g., the receiving part 240 of FIG. 2). The reinforcing member 510 and the receiving part 520 of an embodiment are the same as or similar with the reinforcing member of FIG. 2 (e.g., the reinforcing member 230 of FIG. 2) and the receiving part (e.g., the receiving part 240 of FIG. 2) and therefore, a duplicate description will be omitted.

According to an embodiment, the reinforcing member 510 may be formed in a plate shape, and a hole 511 may be formed in one region of the reinforcing member 510 in which a partial region of one surface of the electronic device 501 may be seen outside the first region 500*a*. As an example, when the first region 500*a* is attached to the rear surface of the electronic device 501, a camera 502 of the electronic device 501 may be visible through the hole 511. According to an embodiment, the receiving part 520 may be formed as to protrude from one region of the reinforcing member 510, and a groove (not shown) may be formed in the receiving part 520. When the first region 500*a* is attached to one surface of the electronic device 501 through the groove, the receiving part 520 may include a space in which a pen 570 (e.g., the pen 270 of FIG. 2) may be accommodated.

Figure 6:
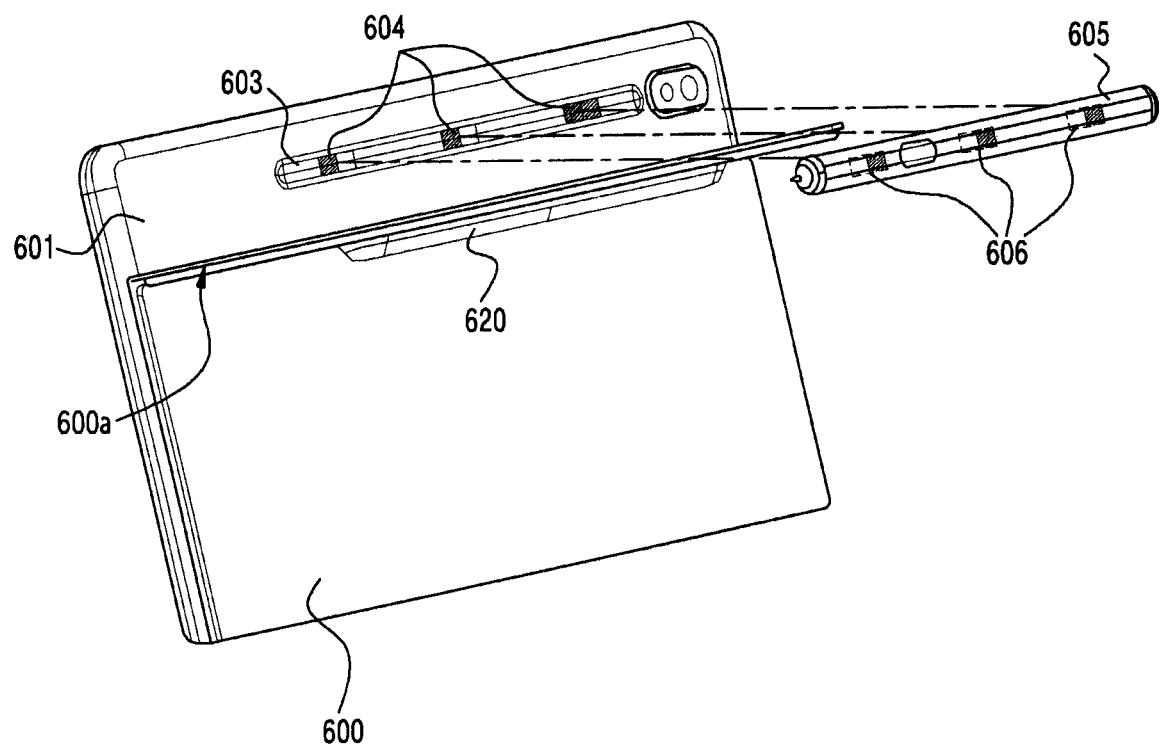
FIG. 6 is a perspective view illustrating a seating groove formed in one surface of an electronic device, and a pen.

FIG. 6 is a perspective view illustrating a seating groove 603 formed in one surface of an electronic device 601, and a pen 605.

Referring to FIG. 6, the electronic device 601 of an embodiment may include a touch screen panel (not shown) capable of simultaneously performing input/output operations. The touch screen panel may include a first panel capable of detecting a touch input by the pen 605, and a second panel capable of detecting a touch input by the user's body, and may thus detect all potential inputs generated via the user's body and the electronic pen 605. As an example, the first panel may recognize the input by the pen 605 using an electromagnetic resonance (EMR) scheme involving a change of electromagnetic resonance generated when the pen 605 approaches the first panel. In another example, input by the pen 605 may be recognized via an active electrostatic (AES) scheme using static electricity provided from the pen 605.

At least one magnet 604 may be mounted inside the electronic device 601 of an embodiment, which may interact with at least one magnet 606 disposed within the pen 605. As an example, a series of magnets 604 may be mounted within the electronic device 601 at regular intervals, and a series of magnets 606 may be disposed within the pen 605 at positions corresponding to the positions of each of the magnets 604 of the electronic device 601. When the pen 605 is brought near to one surface of the electronic device 601 (e.g., a rear surface of the electronic device), the pen 605 may be detachably affixed to the one surface of the electronic device 601 through magnetic coupling between the magnet(s) 606 mounted inside the pen 605 and the magnet(s) 604 mounted inside the electronic device 601. According to an embodiment, the electronic device 601 may include a wireless charging unit (not shown), and the wireless charging unit may be disposed in a position adjacent to one surface of the electronic device 601 to which the pen 605 is attached. The pen 605 used in the electronic device 601 including an AES type touch screen includes a battery (not shown) for providing static electricity therein. When the pen 605 is attached to the one surface of the electronic device 601, the wireless charging unit may wirelessly charge the battery inside the pen 605.

According to an embodiment, the seating groove 603 may be formed in one surface of the electronic device 601. The seating groove 603, for example, may be formed in a shape corresponding to an outer circumferential surface of the pen 605, but is not limited thereto. According to an embodiment, the pen 605 may be seated in the seating groove 603 and be fixed to one surface of the electronic device 601.

According to an embodiment, a cover 600 may be attached to one surface of the electronic device 601. The cover 600 may include a first region 600*a* (e.g., the first region 220*a* of FIG. 2) capable of being spaced apart from one surface of the electronic device 601 according to user's handling. A receiving part 620 (e.g., the receiving part 240 of FIG. 2) presenting a pen receiving space between one surface of the electronic device 601 and the cover 600 may be formed in the first region 600*a*. That is, the electronic device 601 may firstly fix the pen 605 to the seating groove 603 through magnetic coupling, and may secondarily accommodate the pen 605 within the receiving space of the receiving part 620, thereby protecting the electronic pen 605 from damage and loss.

Figure 7:
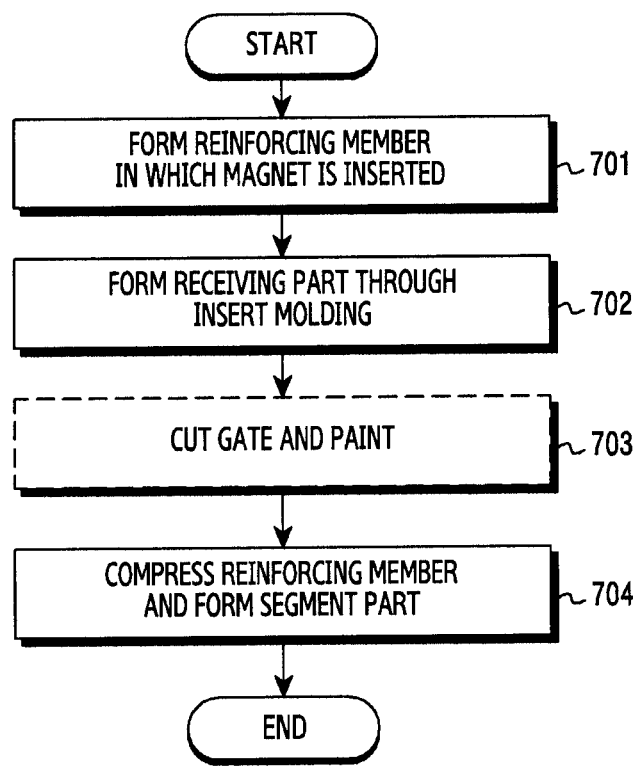
FIG. 7 is a flowchart of a manufacturing process of a cover according to an embodiment.

FIG. 7 is a flowchart of a manufacturing process of a cover according to an embodiment.

Figure 8A:
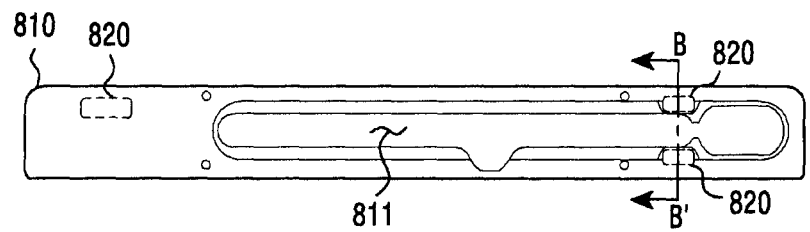
FIG. 8A is a front view illustrating a reinforcing member into which a magnet is inserted.
Figure 8B:
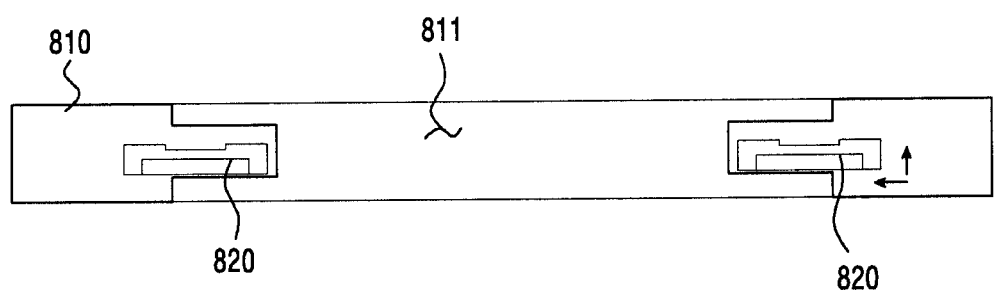
FIG. 8B is a cross-sectional view of the reinforcing member of FIG. 8A taken in a B-B' direction.
Figure 8C:
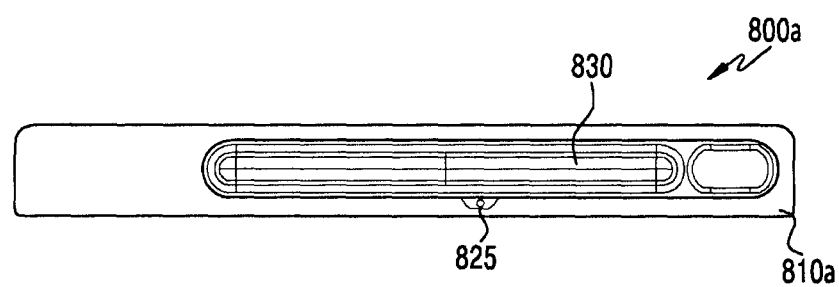
FIG. 8C is a front view illustrating a receiving part formed by insert molding.
Figure 8D:
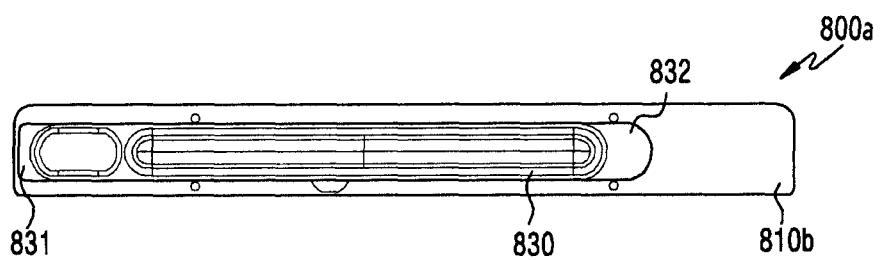
FIG. 8D is a front view of the receiving part of FIG. 8C viewed in an opposite direction.
Figure 8E:
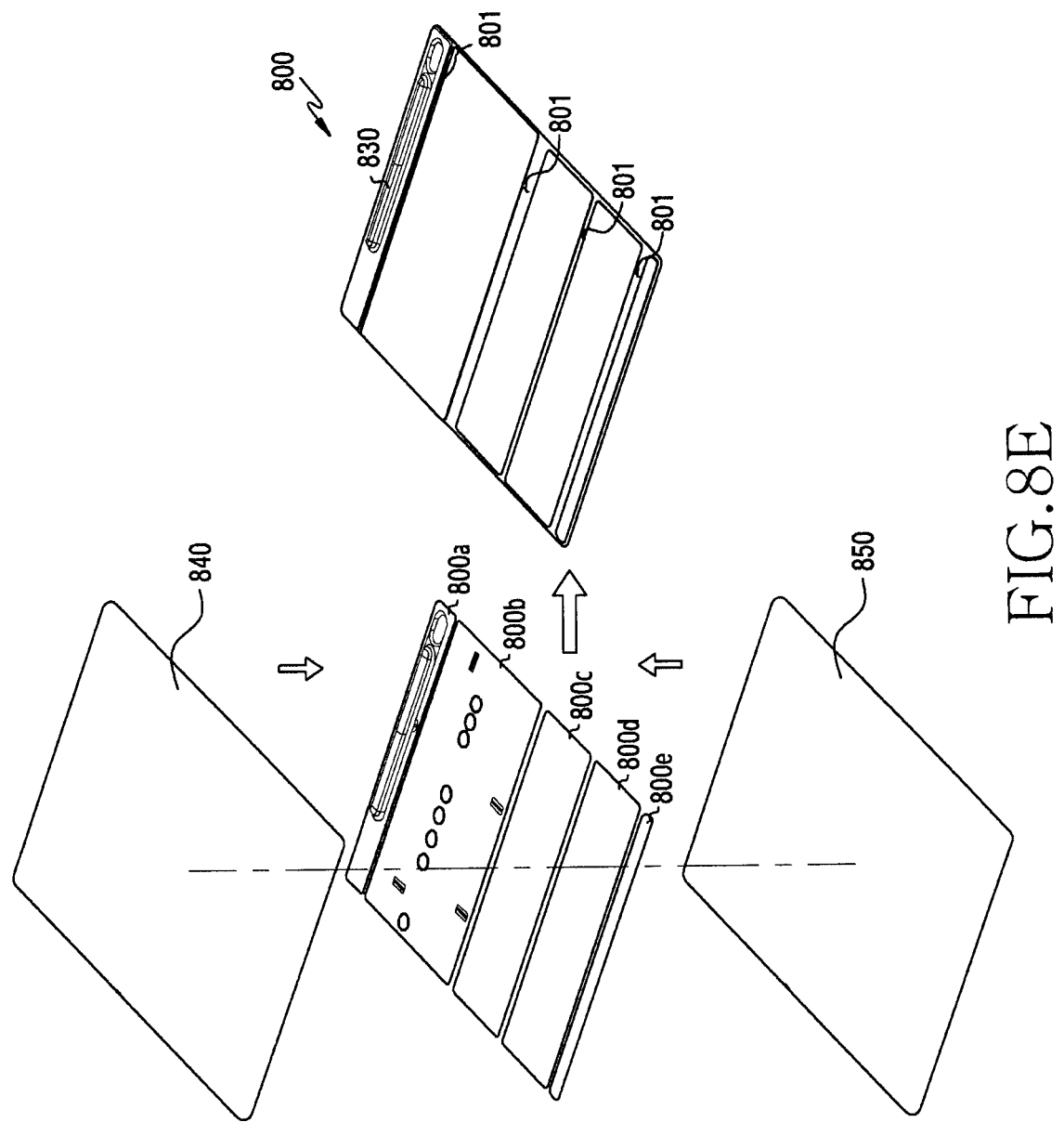
FIG. 8E is a diagram illustrating a process of forming a segment part by compressing a reinforcing member by an outer skin and an inner skin.

FIG. 8A is a front view illustrating a reinforcing member 810 in which a magnet 820 is inserted. FIG. 8B is a cross-sectional view of the reinforcing member 810 of FIG. 8A taken in a B-B' direction. FIG. 8C is a front view illustrating a receiving part 830 formed by insert molding. FIG. 8D is a front view of the receiving part of FIG. 8C viewed in an opposite direction. FIG. 8E is a diagram illustrating a process of forming a segment part by compressing a reinforcing member by an outer skin and an inner skin.

In describing the cover manufacturing process of FIG. 7, a description will be made with reference to the examples of FIG. 8A to FIG. 8E.

Referring to FIG. 7, in process 701, the cover manufacturing process of an embodiment may include forming a reinforcing member 810 in which a magnet 820 is mounted as shown in FIG. 8A. According to an embodiment, the reinforcing member 810 may be formed of an epoxy material having a certain degree of flatness (or plan) and rigidity. However, the material of the reinforcing member 810 is not limited to epoxy, and the reinforcing member 810 may be formed of other materials (e.g., a synthetic resin structure, a metal structure, etc.) having excellent flatness and rigidity, besides the epoxy, as well. In process 701 of an embodiment, the reinforcing member 810 may be manufactured via lamination of an epoxy layer. A hole 811 may be formed in at least one region of the reinforcing member 810, and a receiving part may be formed in the hole 811 (e.g., the inner hole 441 of FIG. 4A). According to an embodiment, the receiving part may be formed in such a manner that a receiving part structure formed separately inside the inner hole 811 is assembled. At this time, the receiving part structure may be assembled, as an example, in a manner of being attached to the hole 811 through an adhesive or bonding agent, and the receiving part structure may be assembled, as another example, in a manner of being fused to the hole 811 as well. In a further example, a connecting structure (e.g., a hook) may be formed in the receiving part structure and the hole 811 and thus, the receiving part structure and the hole 811 may be assembled through the connecting structure as well. According to another embodiment, the receiving part may be formed in a manner of being injected into the hole 811 in an insert molding method as well, and a detailed description thereof will be made later.

According to an embodiment, in process 701, the reinforcing member 810 in which the magnet 820 is mounted may be manufactured by inserting the magnet 820 in an epoxy layer laminating process. Referring to FIG. 8B, as the reinforcing member 810 is manufactured in process 701 of an embodiment in a scheme of inserting the magnet 820 in the epoxy layer laminating process, a position in which the magnet 820 within the reinforcing member 810 is mounted may be freely adjusted. According to an embodiment, the position in which the magnet 820 is mounted may be adjusted to a position closer to the hole 811, or may be adjusted to a position closer to an upper surface of the reinforcing member 810. By manufacturing the reinforcing member 810 in which the magnet 820 is mounted through the above-described method, in process 701, all traces of the mounting of the magnet 820 are removed from an exterior of the reinforcing member 810, and thus, an aesthetic characteristic of the cover may be improved.

According to an embodiment, in process 702, the receiving part 830 may be formed in one region of the reinforcing member 810. According to an embodiment, in process 702, after the reinforcing member 810 having the hole 811 formed in a mold is inserted, the receiving part 830 having a groove (e.g., 341 of FIG. 3A) therein may be formed in an insert molding scheme of injecting the receiving part 830. The receiving part 830 may be formed to have a thickness of about 0.8 T (0.8 mm), and the receiving part 830 may be formed of a material different from that of the reinforcing member 810. According to an embodiment, the receiving part 830 may be formed of thermoplastic polyurethane (TPU), and in particular, may be formed of thermoplastic polyurethane having a shore hardness of 80 degrees or 98 degrees or less. When the receiving part 830 is formed of thermoplastic polyurethane having a shore hardness of about 80 degrees or less, a problem may occur in that the receiving part 830 may be damaged by external impact because of insufficient rigidity. In contrast, when the receiving part 830 is formed of thermoplastic polyurethane having a shore hardness of greater than about 98 degrees, it may be prone to cracks when experiencing external impact, and so to avoid this issue, the receiving part 830 may be formed of thermoplastic polyurethane having a shore hardness of about 80 degrees or 98 degrees or less. Referring to FIG. 8D, in process 702 of an embodiment, when the receiving part 830 is injected into a lower surface 810*b* of the reinforcing member 810, the receiving part 830 may be formed more widely than an outer circumferential surface of the hole 811 formed in the reinforcing member 810. Through the above-mentioned process, extension parts 831 and 832 of the outer circumferential surface of the hole 811 may be formed in the receiving part 830, as injected into a bottom of the reinforcing member 810. In process 702, a gas (e.g., air) within a mold may be discharged to an exterior of the mold without an air vent or gas vent through injection of the extension parts 831 and 832. That is, in the cover manufacturing process of an embodiment, the receiving part 830 is formed through the insert molding, whereby the reinforcing member 810 may be formed of a material having sufficient flatness and rigidity, and the receiving part 830 may be formed of a material having sufficient rigidity and moldability.

Referring to FIG. 8C, in process 703, a gate (or a side gate) used in the process of injecting the receiving part 830 may be cut, and the receiving part 830 may be painted to provide an aesthetic characteristic. Due to the gate cutting, a minute gate cutting trace 825 may remain in a partial region of the receiving part 830, but as the receiving part 830 is painted, the gate cutting trace 825 may not be seen with naked eyes. That is, in the cover manufacturing process of an embodiment, one region 800*a* (e.g., the first region 220*a* of FIG. 2) of the cover having the receiving part 830 may be manufactured through the above-described processes 701, 702, and 703.

Referring to FIG. 8E, in process 704, the one region 800*a* (e.g., the first region 220*a* of FIG. 2) of the cover formed through the above-described processes 701, 702, and 703) and the remaining regions 800*b*, 800*c*, 800*d*, and 800*e* (e.g., the second region 220*b* and front cover 210 of FIG. 2) of the cover may be placed on a jig (not shown), and then the one region 800*a* of the cover and the remaining regions 800*b*, 800*c*, 800*d*, and 800*e* of the cover may be compressed by using an outer skin 840 and an inner skin 850. According to an embodiment, the outer skin 840 and the inner skin 850 used in a compression process may be formed of polyurethane (PU), leather, a synthetic material, or a fabric material, but is not limited thereto. At this time, among the one region 800*a* of the cover, a region where the receiving part 830 is formed is not compressed by the outer skin 840 and the inner skin 850.

When compressed with the outer skin 840 and the inner skin 850, the one region 800*a* of the cover and the remaining regions 800*b*, 800*c*, 800*d*, and 800*e* of the cover may be disposed to be spaced apart from each other, respectively, so a plurality of segment parts 801 (e.g., 111 of FIG. 1A or 121 of FIG. 1B) may be formed between the one region 800*a* of the cover and the remaining regions 800*b*, 800*c*, 800*d*, and 800*e* of the cover. Here, some segment parts 801 may be used as a side member (e.g., the side member 115 of FIGS. 1A and 1B) for protecting one side surface of the electronic device. According to an embodiment, the one region 800*a* of the cover and the remaining regions 800*b*, 800*c*, 800*d*, and 800*e* of the cover may each independently rotate through the segment part 801.

Through process 704, the one region 800*a* of the cover and the remaining regions 800*b*, 800*c*, 800*d*, and 800*e* of the cover may be connected and the cover 800 may be manufactured, and as the component elements are compressed with the outer skin 840 and the inner skin 850, the aesthetic characteristic of an appearance of the cover 800 may be secured and the component elements inside the cover 800 may be prevented from being damaged by external factors. That is, in the cover manufacturing process of an embodiment, the cover 800 in which the receiving part 830 capable of accommodating a pen is formed in a partial region may be manufactured through the above-mentioned process 701 to process 704.

Figure 9:
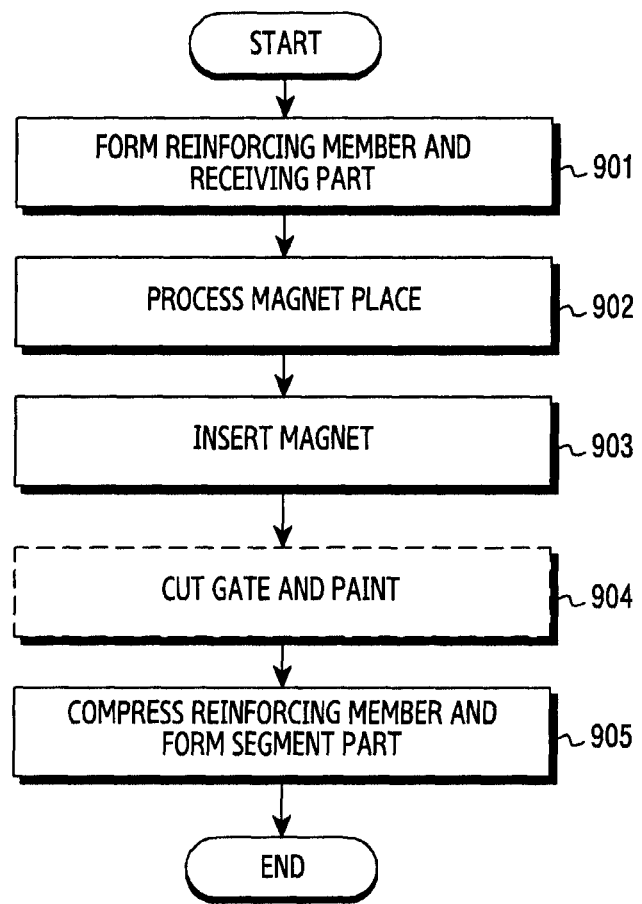
FIG. 9 is a flowchart of a manufacturing process of a cover according to another embodiment.

FIG. 9 is a flowchart of a manufacturing process of a cover according to another embodiment.

Figure 10A:
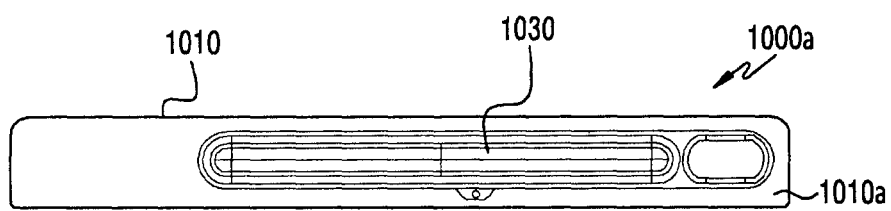
FIG. 10A is a front view illustrating a reinforcing member and a receiving part formed through single injection.
Figure 10B:
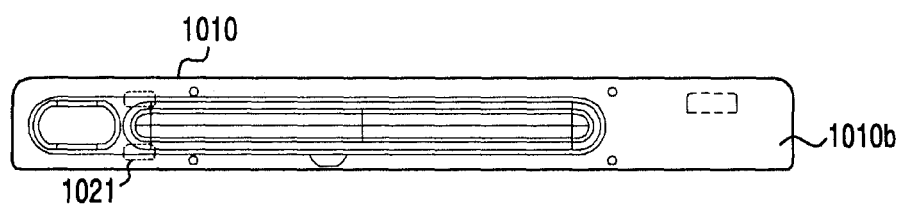
FIG. 10B is a front view illustrating a reinforcing member in which a magnet place is formed.
Figure 10C:
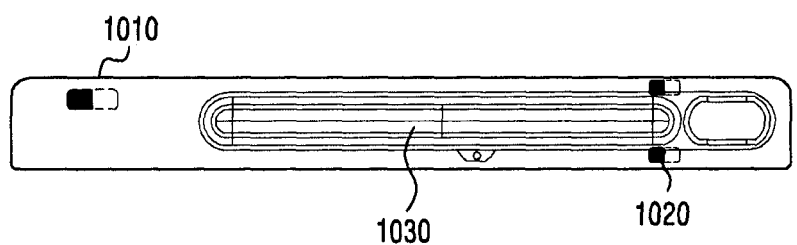
FIG. 10C is a front view illustrating a state in which a magnet is inserted into a magnet place formed in a reinforcing member.

FIG. 10A is a front view illustrating a reinforcing member and a receiving part that are formed through single injection. FIG. 10B is a front view illustrating the reinforcing member in which a magnet place is formed. FIG. 10C is a front view illustrating a state in which a magnet is inserted into the magnet place formed in the reinforcing member.

In describing the cover manufacturing process of FIG. 9, a description will be made with reference to the examples of FIG. 10A to FIG. 10C.

Referring to FIG. 9, in the cover manufacturing process of another embodiment, one region 1000*a* of a cover including a receiving part 1030 and a reinforcing member 1010 may be manufactured through process 901. Referring to FIG. 10A, in process 901 of an embodiment, the reinforcing member 1010 and the receiving part 1030 may be manufactured through single injection, and the reinforcing member 1010 and the receiving part 1030 may be formed of the same material. As an example, the reinforcing member 1010 and the receiving part 1030 may be formed of one of polycarbonate or thermoplastic polyurethane, but is not limited thereto.

Although not illustrated in the drawings, in process 901 of another embodiment, the reinforcing member 1010 and the receiving part 1030 may be manufactured through double injection, at which time the reinforcing member 1010 and the receiving part 1030 may be formed of different materials, respectively. As an example, the reinforcing member 1010 may be formed of a polycarbonate material, and the receiving part 1030 may be formed of a thermoplastic polyurethane material.

Referring to FIG. 10B, in process 902 of an embodiment, a magnet mounting space 1021 (into which a magnet may be mounted) may be formed in one region 1000*a* of the cover manufactured through process 901. Since the receiving part 1030 is formed as to protrude from an upper surface 1010*a* of the reinforcing member 1010, in process 902, the magnet mounting space 1021 may be formed in a manner of cutting a partial region of a lower surface 1010*b* of the reinforcing member 1010. According to an embodiment, the magnet mounting space 1021 may be formed in a region adjacent to the receiving part 1030 and in a partial region of an edge of the reinforcing member 1010, but according to an embodiment, a position in which the magnet mounting space 1021 is formed may vary as well.

Referring to FIG. 10C, in process 903 of an embodiment, after a magnet 1020 is inserted into the magnet mounting space 1021 formed through process 902, the magnet mounting space 1021 may be filled with the same or similar material to the reinforcing member 910. The magnet 1020 may be mounted within the reinforcing member 1010 through the above-described process 903.

According to an embodiment, in process 904, a gate (or a side gate) used in a process of single injecting or double injecting the reinforcing member 1010 and the receiving part 1030 may be cut, and the receiving part 1030 may be painted, thereby increasing an aesthetic characteristic of the cover 1000.

The one region 1000*a* of the cover may be manufactured through the above-described processes 901 to 904, and in process 905 of an embodiment, the one region 1000*a* of the cover manufactured through the above-described processes and the remaining regions (e.g., the remaining region 800*b* of the cover of FIG. 8E) of the cover may be compressed with an outer skin (e.g., the outer skin 840 of FIG. 8E) and an inner skin (e.g., the inner skin 850 of FIG. 8E).

In detail, after the one region 1000*a* of the cover and the remaining regions of the cover are placed on a jig, the component elements may be compressed using the outer skin and the inner skin. At this time, among the one region 1000*a* of the cover, a region where the receiving part 1030 is formed is not compressed, and the remaining region except the region where the receiving part 1030 is formed may be compressed with the outer skin and the inner skin. When compressed by the outer skin and the inner skin, the one region 1000*a* of the cover and the remaining regions of the cover may be spaced apart from each other and disposed, so a plurality of segment parts (e.g., the segment part 801 of FIG. 8E) may be formed between the one region 1000*a* of the cover and the remaining regions of the cover. The one region 1000*a* of the cover and the remaining regions of the cover may independently rotate through the segment part 801. However, since process 905 is the same as or similar to process 704 of FIG. 7 mentioned earlier, a duplicate description will be omitted.

That is, in the cover manufacturing process of another embodiment, the cover in which the receiving part 1030 capable of accommodating the pen is formed in a partial region may be manufactured through the above-described process 901 to process 905.

A cover (e.g., the cover 100 of FIGS. 1A and 1B) attached to an electronic device of certain embodiments of the present disclosure may include a first region (e.g., the first region 120a of FIG. 1B) covering a partial region of at least one surface among a front surface and a rear surface of the electronic device when the cover is attached to the electronic device, and a second region (e.g., the second region 120b of FIG. 1B) covering a partial region of the one surface in adjacent to the first region. At least one region of the first region may be spaced apart from one surface of the electronic device in a state in which the second region is attached to one surface of the electronic device, and the first region may have a receiving part (e.g., the receiving part 140 of FIG. 1B) protruded and formed to receive a pen between the first region and the electronic device.

According to an embodiment, a groove (e.g., the groove 341 of FIG. 3A) for accommodating the pen may be formed in the receiving part.

According to an embodiment, the first region may further have a hole (the hole 131 of FIG. 1B) through which a partial region of the electronic device is seen outside the cover when the cover is attached to the electronic device.

According to an embodiment, the receiving part may be formed of a material different from that of the first region.

According to an embodiment, the first region may be formed of an epoxy material, and the receiving part may be formed of a thermoplastic polyurethane (TPU) material.

According to an embodiment, the receiving part may be formed of a material having a shore hardness of 80 degrees to 98 degrees.

According to an embodiment, the cover (e.g., the cover 500 of FIG. 5A) is adjacent to the second region (e.g., the second region 500b of FIG. 5A), but may further include a third region (e.g., the third region 500c of FIG. 5A) having a third width and a first height, and at least one region of the second region may be spaced apart from one side surface of the electronic device in a state in which the third region is attached to one surface of the electronic device.

According to an embodiment, the cover may further include first and second magnets (e.g., the first magnet 461 and the second magnet 462 of FIG. 4A) disposed at an edge of the receiving part, and a third magnet (e.g., the third magnet 463 of FIG. 4A) disposed in one region of the first region spaced apart from the receiving part.

An electronic device (e.g., the electronic device 201 of FIG. 2) of certain embodiments of the present disclosure may include a cover (e.g., the cover 200 of FIG. 2) attached to the electronic device and covering at least one surface among a front surface or a rear surface of the electronic device. The cover may include a first region (e.g., the first region 220a of FIG. 2) covering a partial region of the one surface, and a second region (e.g., the second region 220b of FIG. 2) adjacent to the first region and covering a partial region of the one surface. At least one region of the first region may be spaced apart from one surface of the electronic device in a state in which the second region is attached to one surface of the electronic device. The first region may have a receiving part (e.g., the receiving part 240 of FIG. 2) protruded and formed to receive a pen between the first region and the electronic device.

According to an embodiment, a seating groove (e.g., the seating groove 603 of FIG. 6) for seating the pen may be formed in at least one surface of the electronic device to which the cover is attached.

According to an embodiment, a groove (e.g., the groove 341 of FIG. 3A) for accommodating the pen may be formed within the receiving part.

According to an embodiment, the receiving part may be formed of a material different from that of the first region.

According to an embodiment, the first region may be formed of an epoxy material, and the receiving part may be formed of a thermoplastic polyurethane (TPU) material.

An electronic device (e.g., the electronic device 101 and 103 of FIGS. 1A and 1B) of certain embodiments of the present disclosure may include a front cover (e.g., the first cover 110 of FIG. 1A) covering a front surface of the electronic device, a rear cover (e.g., the second cover 120 of FIG. 1B) attached to a rear surface of the electronic device, and covering the rear surface, a side cover (e.g., the side cover 115 of FIGS. 1A and 1B) connected to the front cover and the rear cover, and covering one side surface of the electronic device, and a pen (e.g., the pen 605 of FIG. 6) capable of being accommodated between the rear cover and the rear surface of the electronic device. The rear cover may include a first region (e.g., the first region 120a of FIG. 1B) covering a partial region of the rear surface, and a second region (e.g., the second region 120b of FIG. 1B) having a second width and first height covering a partial region of the rear surface in adjacent to the first region. At least one region of the first region may be spaced apart from the rear surface of the electronic device in a state in which the second region is attached to the rear surface of the electronic device. The first region may have a receiving part (e.g., the receiving part 140 of FIG. 1B) protruded and formed to accommodate the pen between the first region and the rear surface of the electronic device, and a first magnet (e.g., the magnet 460 of FIG. 4A) for fixing the cover with respect to the electronic device.

According to an embodiment, the electronic device may include a first panel capable of recognizing an input by the pen and a second panel capable of recognizing a user's touch input.

According to an embodiment, the electronic device may further include a second magnet (e.g., the magnet 606 of FIG. 6) located inside the pen, and a third magnet (e.g., the magnet 604 of FIG. 6) located inside the electronic device and coupled to the second magnet by a magnetic force.

According to an embodiment, the electronic device may further include a wireless charging unit (not shown) located inside the electronic device and capable of wirelessly charging the pen.

According to an embodiment, a seating groove (e.g., the seating groove 603 of FIG. 6) for seating the pen may be formed in a rear surface of the electronic device.

According to an embodiment, the first region may be formed of an epoxy material, and the receiving part may be formed of a thermoplastic polyurethane (TPU) material.

According to an embodiment, the receiving part may be formed of a material having a shore hardness of 80 degrees to 98 degrees.

In the aforementioned detailed embodiments of the present disclosure, a component element included in the disclosure has been expressed in a singular form or a plural form according to a proposed concrete embodiment. But, the expression of the singular form or plural form is selected suitable to a given situation for description convenience's sake, and the present disclosure is not limited to singular or plural component elements. Even if a component element is expressed in the plural form, the component element can be implemented in the singular form, or even if a component element is expressed in the singular form, the component element can be implemented in the plural form.

On the other hand, in a detailed description of the present disclosure, a concrete embodiment has been described, but it is undoubted that various modifications are available without departing from the scope of the present disclosure.

Therefore, the scope of the present disclosure should not be limited to and defined by the described embodiment and should be defined by not only claims described later but also those equivalent to these claims.

What is claimed is:

1. A cover attachable to an electronic device, comprising:
a first region covering a first portion of a first surface of the electronic device, when the cover is attached to the electronic device;
a second region covering a second portion of the first surface of the electronic device, the second region adjacent to the first region;
a first magnet and a second magnet disposed at an edge of a receiving part; and
a third magnet disposed on the first region of the cover and spaced apart from the receiving part,
wherein the first region comprises the receiving part protruding from a surface of the first region of the cover in a direction from the first surface of the electronic device toward the surface of the first region and including a hollow for receiving an electronic pen, and
wherein the first region of the cover is pivotable relative to the second region of the cover, such that the first region of the cover is spaced away from the first surface of the electronic device while the second region of the cover contacts the first surface of the electronic device.

2. The cover of claim 1, wherein the hollow includes a groove for receiving the electronic pen within the receiving part.

3. The cover of claim 1, wherein the first region further includes a hole through which a portion of the electronic device is visible to an external environment when the first region of the cover contacts the electronic device.

4. The cover of claim 1, wherein the receiving part is formed of a material different from a material forming the first region of the cover.

5. The cover of claim 4, wherein the first region is formed of an epoxy material, and
wherein the receiving part is formed of a thermoplastic polyurethane (TPU) material.

6. The cover of claim 5, wherein the receiving part is formed of a material having a shore hardness of about 80 degrees to 98 degrees.

7. The cover of claim 1, wherein the cover further includes a third region disposed adjacent to the second region of the cover, and
wherein the second region of the cover is pivotable relative to the third region of the cover, such that the second region of the cover is spaced apart from the first surface of the electronic device while the third region of the cover contacts the first surface.

8. An electronic device, comprising
a cover attached to the electronic device and covering at least a first surface of the electronic device,
wherein the cover comprises:
a first region covering a first portion of the first surface of the electronic device,
a second region covering a second portion of the first surface of the electronic device, the second region adjacent to the first region;
a receiving part protruding from a surface of the first region of the cover in a direction from the first surface of the electronic device toward the surface of the first region for receiving an electronic pen;
a first magnet and a second magnet disposed at an edge of the receiving part; and
a third magnet disposed on the first region of the cover and spaced apart from the receiving part,
wherein the first region of the cover is pivotable relative to the second region of the cover, such that the first region of the cover is spaced away from the first surface of the electronic device while the second region of the cover contacts the first surface of the electronic device.

9. The electronic device of claim 8, wherein the receiving part includes a seating groove for receiving the electronic pen.

10. The electronic device of claim 8, wherein the receiving part includes a groove for receiving the electronic pen within the receiving part.

11. The electronic device of claim 8, wherein the receiving part is formed of a material different from a material forming the first region of the cover,
wherein the first region is formed of an epoxy material, and
wherein the receiving part is formed of a thermoplastic polyurethane (TPU) material.

12. The electronic device of claim 8, wherein the first region further includes a first magnet for detachably securing the cover to the electronic device.

13. The electronic device of claim 8, wherein the electronic pen includes a first magnet, and
wherein the electronic device includes a second magnet disposed therein to correspond in position to the receiving part.

14. The electronic device of claim 8, wherein the electronic device further includes a seating groove for receiving the electronic pen on a second surface of the electronic device.

15. The electronic device of claim 8, wherein the first region further includes a hole through which a portion of the electronic device is visible to an external environment when the first region of the cover contacts the electronic device.

16. The electronic device of claim 8, wherein the first region is formed of an epoxy material, and
wherein the receiving part is formed of a thermoplastic polyurethane (TPU) material.

17. The electronic device of claim 16, wherein the receiving part is formed of a material having a shore hardness of about 80 degrees to 98 degrees.

18. The electronic device of claim 8, wherein the cover further includes a third region disposed adjacent to the second region of the cover, and
wherein the second region of the cover is pivotable relative to the third region of the cover, such that the second region of the cover is spaced apart from the first surface of the electronic device while the third region of the cover contacts the first surface.

* * * * *